(12) United States Patent
Park et al.

(10) Patent No.: US 9,785,248 B2
(45) Date of Patent: Oct. 10, 2017

(54) DISPLAY DEVICE AND METHOD FOR DRIVING THE SAME

(71) Applicant: LG ELECTRONICS INC., Seoul (KR)

(72) Inventors: Soungsoo Park, Seoul (KR); Hyounghwa Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 14/775,530

(22) PCT Filed: Mar. 14, 2013

(86) PCT No.: PCT/KR2013/002053
§ 371 (c)(1),
(2) Date: Sep. 11, 2015

(87) PCT Pub. No.: WO2014/142370
PCT Pub. Date: Sep. 18, 2014

(65) Prior Publication Data
US 2016/0026254 A1    Jan. 28, 2016

(51) Int. Cl.
*G06F 3/033*    (2013.01)
*G06F 3/01*    (2006.01)
*G06F 3/03*    (2006.01)

(52) U.S. Cl.
CPC ............ *G06F 3/017* (2013.01); *G06F 3/0304* (2013.01)

(58) Field of Classification Search
CPC .......... G06F 3/0304; G06F 3/017; G06F 3/01; G06F 3/03; G06F 3/0488; G06F 3/04883
USPC .................................. 345/156–160, 173–179
See application file for complete search history.

(56) References Cited

U.S. PATENT DOCUMENTS

| | | | | |
|---|---|---|---|---|
| 8,555,207 | B2 * | 10/2013 | Hildreth .................. | G06F 3/017 715/856 |
| 8,768,006 | B2 * | 7/2014 | Subramanian ..... | G06K 9/00201 345/156 |
| 8,878,779 | B2 * | 11/2014 | Givon ..................... | G06F 3/017 345/156 |
| 2009/0217211 | A1 | 8/2009 | Hildreth et al. | |
| 2012/0093360 | A1 | 4/2012 | Subramanian et al. | |
| 2012/0218183 | A1 | 8/2012 | Givon et al. | |
| 2012/0242793 | A1 | 9/2012 | Im et al. | |

OTHER PUBLICATIONS

Shaker et al., "Real-time Finger Tracking for Interaction", Proceedings of the 5th International Symposium on image and Signal Processing and Analysis (2007), pp. 141-145.

* cited by examiner

*Primary Examiner* — Vijay Shankar
(74) *Attorney, Agent, or Firm* — Birch, Stewart, Kolasch & Birch, LLP

(57) ABSTRACT

A display device and a method for driving the same are disclosed. The display device includes a display unit configured to display a pointer and a controller configured to differently control a motion of the pointer corresponding to a moving distance of a pointing part depending on a distance from the pointing part inputting a gesture command.

13 Claims, 36 Drawing Sheets

(A)

(B)

(A)

(B)

DISPLAY DEVICE AND METHOD FOR DRIVING THE SAME

TECHNICAL FIELD

The present disclosure relates to a display device and a method for driving the same.

BACKGROUND ART

Display devices, such as broadcasting signal receivers (e.g., television), equipped with a network function receiving a data stream according to a real-time streaming scheme through a network such as the Internet, decoding the received data stream into audio and video signals, and processing the audio and video signals are now widely used.

The display devices can carry out such functions as selecting a predetermined object displayed on a screen according to a user's gesture and moving a pointer. The aforementioned method may be called a remote pointing method.

A remote pointing method used in a related art display device has a problem in which it is not easy to move a pointer when a pointing part for inputting a gesture command is relatively far away from the display device.

SUMMARY OF INVENTION

Technical Problem

The present disclosure provides a display device and a method for driving the same capable of easily moving a pointer when a pointing part is relatively far away from the display device.

Technical Solution

In one aspect, there is a display device comprising a display unit configured to display a pointer and a controller configured to differently control a motion of the pointer corresponding to a moving distance of a pointing part depending on a distance from the pointing part inputting a gesture command.

The display device may further comprise a motion sensing unit configured to sense the distance from the pointing part.

When a distance between the motion sensing unit and the pointing part is a first distance and the pointing part moves by a first interval, the pointer may be configured to move by a second interval on the display unit. When the distance between the motion sensing unit and the pointing part is a second distance greater than the first distance and the pointing part moves by the first interval, the pointer may be configured to move by a third interval greater than the second interval on the display unit.

In another aspect, there is a display device comprising a display unit configured to display a pointer and a controller configured to differently control a motion of the pointer corresponding to a moving distance of a pointing part depending on an angle between the pointing part inputting a gesture command and the display unit.

The display device may further comprise a motion sensing unit configured to sense the angle between the pointing part and the display unit. The angle between the pointing part and the display unit may be an angle between a straight line connecting the pointing part and the motion sensing unit and a straight line vertical to the motion sensing unit. The straight line vertical to the motion sensing unit may be parallel to a straight line vertical to a screen of the display unit.

When a distance between the motion sensing unit and the pointing part is equal to or greater than a previously set reference distance, the controller may be configured to differently control the motion of the pointer corresponding to the moving distance of the pointing part depending on the angle between the pointing part and the display unit.

When the distance between the motion sensing unit and the pointing part is a first distance equal to or greater than the reference distance, the angle between the pointing part and the display unit is a first angle, and the pointing part moves by a first interval, the pointer may be configured to move by a second interval on the display unit. When the distance between the motion sensing unit and the pointing part is the first distance, the angle between the pointing part and the display unit is a second angle greater than the first angle, and the pointing part moves by the first interval, the pointer may be configured to move by a third interval greater than the second interval on the display unit.

When the distance between the motion sensing unit and the pointing part is a first distance equal to or greater than the reference distance, a horizontal angle between the pointing part and the display unit is a first angle, and the pointing part moves by a first interval in a vertical direction, the pointer may be configured to move by a second interval on the display unit in the vertical direction. The distance between the motion sensing unit and the pointing part is the first distance, the horizontal angle between the pointing part and the display unit is a second angle greater than the first angle, and the pointing part moves by the first interval in the vertical direction, the pointer may be configured to move by a third interval greater than the second interval on the display unit in the vertical direction.

When the distance between the motion sensing unit and the pointing part is a first distance equal to or greater than the reference distance, a vertical angle between the pointing part and the display unit is a first angle, and the pointing part moves by a first interval in a horizontal direction, the pointer may be configured to move by a second interval on the display unit in the horizontal direction. When the distance between the motion sensing unit and the pointing part is the first distance, the vertical angle between the pointing part and the display unit is a second angle greater than the first angle, and the pointing part moves by the first interval in the vertical direction, the pointer may be configured to move by a third interval greater than the second interval on the display unit in the horizontal direction.

In yet another aspect, there is a method for driving a display device comprising detecting a pointing part inputting a gesture command and moving a pointer displayed on a screen of a display unit depending on a motion of the pointing part, wherein the moving of the pointer includes varying a moving distance of the pointer depending on a distance from the pointing part and/or an angle between the pointing part and the display unit.

The method may further comprise setting an interaction area including the pointing part and detecting the motion of the pointing part in the interaction area, wherein the moving distance of the pointer may be set as a ratio of a moving distance of the pointing part to a size of the interaction area.

The distance from the pointing part and/or the angle between the pointing part and the display unit are sensed by a motion sensing unit. The angle between the pointing part and the display unit may be an angle between a straight line connecting the pointing part and the motion sensing unit and a straight line vertical to the motion sensing unit. The straight line vertical to the motion sensing unit may be parallel to a straight line vertical to a screen of the display unit.

A size of the interaction area when a distance between the motion sensing unit and the pointing part is a first distance may be greater than a size of the interaction area when the distance between the motion sensing unit and the pointing part is a second distance greater than the first distance.

When a distance between the motion sensing unit and the pointing part is a first distance equal to or greater than a previously set reference distance and the angle between the pointing part and the display unit is a first angle, a first interaction area may be set. When the distance between the motion sensing unit and the pointing part is the first distance and the angle between the pointing part and the display unit is a second angle greater than the first angle, a second interaction area may be set. A size of the first interaction area may be greater than a size of the second interaction area.

Each of the first interaction area and the second interaction area may include a first area and a second area opposite the first area. A difference between sizes of the first area and the second area of the second interaction area may be greater than a difference between sizes of the first area and the second area of the first interaction area.

The size of the first area of the first interaction area may be greater than the size of the first area of the second interaction area, or the size of the second area of the first interaction area may be greater than the size of the second area of the second interaction area.

In yet another aspect, there is a method for driving a display device comprising detecting a pointing part inputting a gesture command by a motion sensing unit, setting an interaction area including the pointing part, detecting a motion of the pointing part in the interaction area, and moving a pointer displayed on a screen of a display unit depending on the motion of the pointing part, wherein a moving distance of the pointer is set as a ratio of a moving distance of the pointing part to a size of the interaction area, and wherein a size of the interaction area when a distance between the motion sensing unit and the pointing part is a first distance is greater than a size of the interaction area when the distance between the motion sensing unit and the pointing part is a second distance greater than the first distance.

In yet another aspect, there is a method for driving a display device comprising detecting a pointing part inputting a gesture command by a motion sensing unit, setting an interaction area including the pointing part, detecting a motion of the pointing part in the interaction area, and moving a pointer displayed on a screen of a display unit depending on the motion of the pointing part, wherein a moving distance of the pointer is set as a ratio of a moving distance of the pointing part to a size of the interaction area, wherein when a distance between the motion sensing unit and the pointing part is a first distance equal to or greater than a previously set reference distance and an angle between the pointing part and the display unit is a first angle, a first interaction area is set, wherein when the distance between the motion sensing unit and the pointing part is the first distance and the angle between the pointing part and the display unit is a second angle greater than the first angle, a second interaction area is set, and wherein a size of the first interaction area is greater than a size of the second interaction area.

Advantageous Effects

A display device and a method for driving the same according to the present disclosure can stably perform a pointing operation irrespective of a distance.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Figure 1:
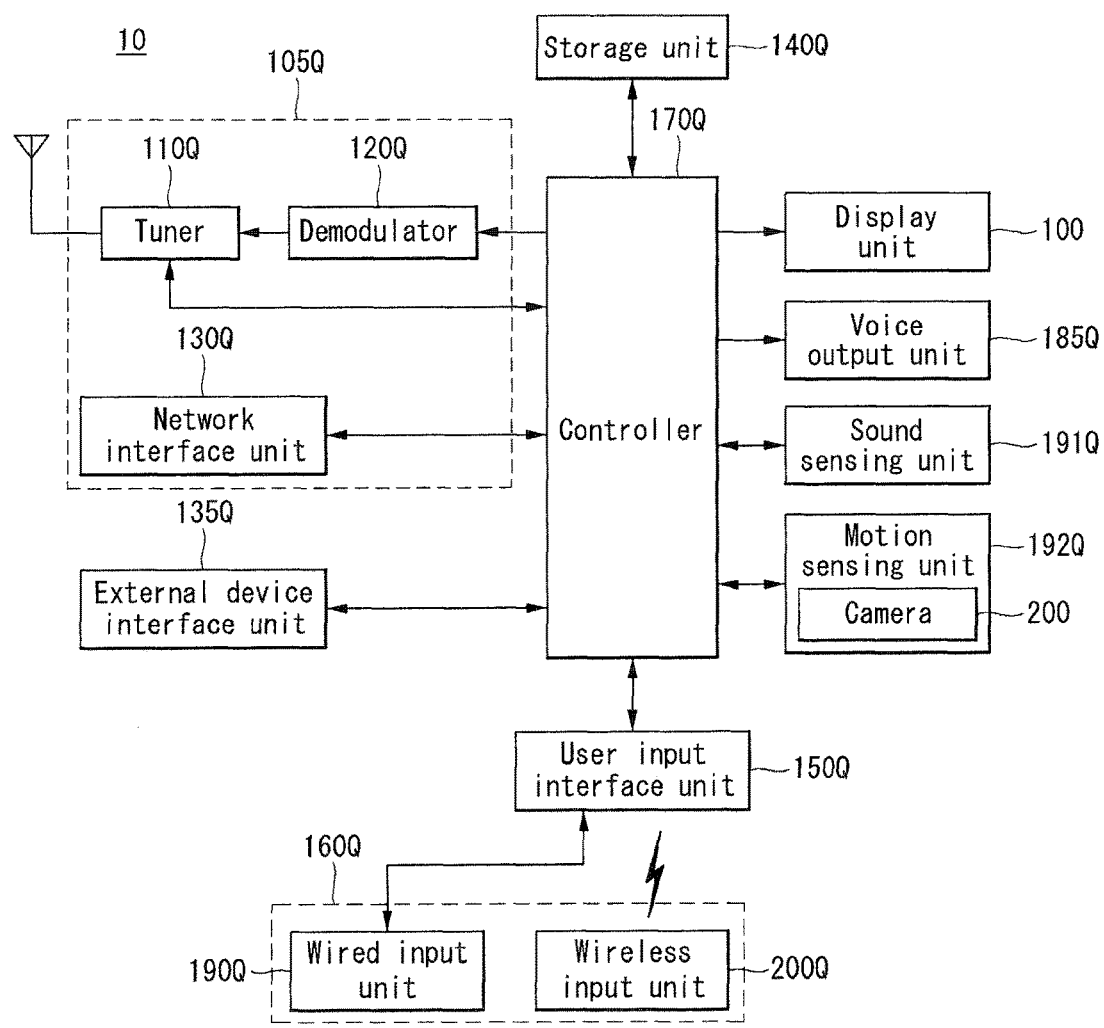
FIG. 1 illustrates configuration of a display device, to which a remote pointing method according to an exemplary embodiment of the invention is applied.

Reference will now be made in detail embodiments of the invention examples of which are illustrated in the accompanying drawings.

Since the present disclosure may be modified in various ways and may have various forms, specific embodiments are illustrated in the drawings and are described in detail in the present specification. However, it should be understood that the present disclosure is not limited to specific disclosed embodiments, but include all modifications, equivalents and substitutes included within the spirit and technical scope of the present disclosure.

The terms 'first', 'second', etc. may be used to describe various components, but the components are not limited by such terms. The terms are used only for the purpose of distinguishing one component from other components. For example, a first component may be designated as a second component without departing from the scope of the present disclosure. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. On the other hand, when an arbitrary component is described as "being directly connected to" or "being directly linked to" another component, this should be understood to mean that no component exists between them.

The terms used in the present application are used to describe only specific embodiments or examples, and are not intended to limit the present disclosure. A singular expression may include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present disclosure pertains. The terms defined in a generally used dictionary must be understood to have meanings identical to those used in the context of a related art, and are not to be construed to have ideal or excessively formal meanings unless they are obviously specified in the present application.

The following exemplary embodiments of the invention are provided to those skilled in the art in order to describe the present disclosure more completely. Accordingly, shapes and sizes of elements shown in the drawings may be exaggerated for clarity.

A broadcasting signal receiver described in the present disclosure as an example of a display device is a kind of intelligent image display device which adds a computer-supporting function to a broadcasting signal receiving function. As a function related to utilizing the Internet is supported in addition to the original broadcasting signal receiving function, more user-friendly interfaces such as a manual-type input device, a touch screen, and a spatial remote controller may be implemented. And thanks to the wired or wireless Internet capability, the broadcasting signal receiver can connect to the Internet or a computer to carry out functions for e-mail, web-browsing, banking, or game. To implement various functions above, a standard general-purpose operating system (OS) may be used.

Therefore, the broadcasting signal receiver according to the present disclosure allows various applications to be added or removed freely, for example, on a general-purpose OS kernel, which enables various user-friendly functions to be carried out. Examples of the broadcasting signal receiver may include a network TV, HBBTV, and smart TV; depending on the situation, the broadcasting signal receiver may also be realized in a smart phone.

In what follows, a broadcasting signal receiver is described as an example of a display device to which the present disclosure is applied. In what follows, a broadcasting signal receiver may be interpreted as a display device.

FIG. 1 illustrates configuration of a display device, to which a remote pointing method according to an exemplary embodiment of the invention is applied.

Referring to FIG. 1, a display device 10 includes a display unit 100, a receiver 105Q, an external device interfacing unit 135Q, a storage unit 140Q, a user input interface unit 150Q, a controller 170Q, and a command input unit 160Q.

The display unit 100 may be regarded as a display panel.

Furthermore, the display device 10 according to the embodiment of the invention can comprise a voice output unit 185Q for outputting a voice, a sound sensing unit 191Q for sensing a voice, and a motion sensing unit 192Q for sensing a user's motion.

The display device 10 according to the embodiment of the invention will be described in more detail below.

A receiver 105Q includes a tuner 110Q, a demodulator 120Q, and a network interface unit 130Q. The receiver 105Q may be designed not to include the network interface unit 130Q while including the tuner 110Q and the demodulator 120Q, if necessary or desired. On the contrary, the receiver 105Q may be designed not to include the tuner 110Q and the demodulator 120Q while including the network interface unit 130Q, if necessary or desired.

The tuner 110Q selects a channel chosen by the user or radio frequency (RF) broadcasting signals corresponding to all of preset channels among RF broadcasting signals received through an antenna. Also, the tuner 110Q converts the chosen RF broadcasting signal to an intermediate frequency signal, a baseband video signal, or a voice signal.

The demodulator 120Q receives a digital IF signal (DIF) converted by the tuner 110Q and demodulates the received DIF.

The demodulator 120Q may output a stream signal TS after carrying out demodulation and channel decoding. In this instance, the stream signal may be a signal multiplexing a video signal, a voice signal, or a data signal.

The stream signal output from the demodulator 120Q may be input to the controller 170Q.

The controller 170Q carries out demultiplexing and video/voice signal processing, displays video on the display unit 100, and outputs a voice through the voice output unit 185Q.

The external device interface unit 135Q may connect an external device to the display device 10 according to the embodiment of the invention. To this purpose, the external device interface unit 135Q may include an A/V input and output unit (not shown) or a wireless communication unit (not shown).

The network interface unit 130Q provides an interface for connecting the display unit 10 to a wired/wireless network including the Internet.

The network interface unit 130Q may transmit and receive data to and from another user or another electronic device through a connected network or another network linked to the connected network.

The storage unit 140Q may store a program for processing and controlling various signals within the controller 170Q or store a signal-processed video, audio, or data signal.

The display unit 10 may play a contents file (a video file, a still image file, a music file, a document file, an application file, and so on) stored in the storage unit 140Q and provide contents to the user.

The command input unit 160Q may include an input key for receiving a user's command. The command input unit 160Q may include a wired input unit 190Q for receiving a command in a wired manner and a wireless input unit 200Q for receiving a command wirelessly.

Through the command input unit 160Q, the user can input various commands such as power on/off, channel selection, display setting, volume control, movement of a cursor or a pointer on a screen, and menu selection.

In the embodiment disclosed herein, the wireless input unit 200Q may be a remote controller.

The user input interface unit 150Q may transfer a signal the user inputs to the controller 170Q through the command input unit 160Q or transfer a signal from the controller 170Q to the command input unit 160Q.

The controller 170Q may demultiplex streams input through the tuner 110Q, the demodulator 120Q, or the external device interface unit 135Q, or process demultiplexed signals, thereby producing and outputting a video signal or a voice signal.

The video signal processed in the controller 170Q is fed to the display unit 100 to be displayed as a video in response to the video signal. Also, the video signal processed in the controller 170Q may be input to an external display device through the external device interface unit 135.

The voice signal processed in the controller 170Q may be output to the voice output unit 185Q. Also, the voice signal processed in the controller 170Q may be input to an external output device through the external device interface unit 135Q.

Moreover, the controller 170Q may control the overall operation within the display device. For example, the controller 170Q controls the tuner 110Q so that the tuner 110Q can tune an RF broadcasting program corresponding to the channel selected by the user or a previously stored channel.

Also, the controller 170Q may control the display device 10 by using a user command or an internal program received through the user input interface unit 150Q.

The controller 170Q may control the display unit 100 to display images.

The controller 170Q may control playing contents. The contents in this case may correspond to the contents stored within the display unit 10, received broadcasting contents, or contents input from the outside. The contents may be at least one of a broadcasting image, an externally input image, an audio file, a still image, a web page accessed, and a document file.

The display unit 100 converts an image signal, a data signal, and an OSD signal processed by the controller 170Q or an image signal, a data signal, etc. received from the external device interface unit 135Q into the respective R, G, and B signals and generates a driving signal.

The display unit 100 may employ PDP, LCD, OLED, flexible display, 3D display, and so on.

Meanwhile, the display unit 100 may be composed of a touch screen, thereby also being used as an input device in addition to being used as an output device.

The voice output unit 185Q receives a voice-processed signal from the controller 170Q, for example, a stereo signal, a 3.1 channel signal, or a 5.1 channel signal; and outputs the received voice-processed signal as a voice. The voice output unit 185Q may be implemented by various forms of speakers.

The sound sensing unit 191Q may sense a sound generated inside or outside the display device 10.

For example, the sound sensing unit 191Q may sense various kinds of sounds generated from the outside, such as a telephone ring sound, a doorbell sound, a sound of water, and a user's voice. To this purpose, the sound sensing unit 191Q may include a voice sensor or a microphone.

The motion sensing unit 192Q may sense the motion of a user. To this purpose, the motion sensing unit 192Q may include a sensor unit (not shown) equipped with at least one of a touch sensor, a voice sensor, a position sensor, and a motion sensor. The signal sensed by the sensing unit may be transmitted to the controller 170Q.

Moreover, the motion sensing unit 192Q may include a camera 200. The image information captured by the camera 200 may be input to the controller 170Q.

Or the motion sensing unit 192Q may include both the sensor unit and the camera 200.

The controller 170Q may detect the user's gesture by using the image captured by the camera 200 or a signal sensed by the sensing unit (not shown) separately or through a combination thereof.

The controller 170Q may move a pointer displayed on the display unit 100, select an object displayed on the display unit 100, or carry out a predetermined function depending on the motion of a pointing part.

The controller 170Q may differently control a motion of a pointer C corresponding to a moving distance of a pointing part 300 depending on a distance from the pointing part 300 inputting a gesture command and/or an angle between the pointing part 300 and the display unit 100.

An operation of the controller 170Q may be described in detail below.

The motion sensing unit 192Q may also sense such information as the shape of the user's face and a viewing direction of the user's face as well as the user's motion.

Although not shown, the camera 200 may include a plurality of cameras. The plurality of cameras may be configured to operate as a stereo camera.

Figure 2:
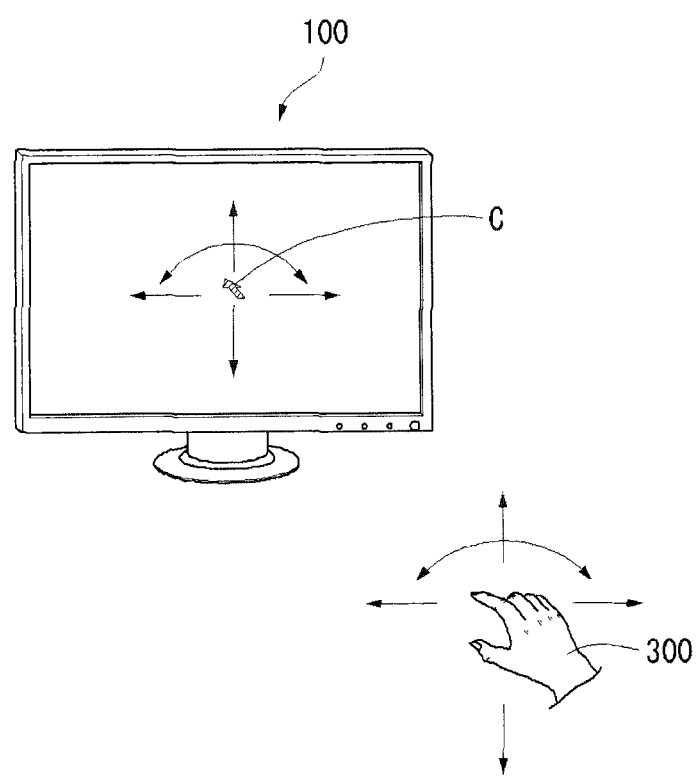
FIG. 2 illustrates a motion of a pointing part and a control method based on the motion.

FIG. 2 illustrates a motion of a pointing part of a user and a control method based on the motion. In what follows, those descriptions given above will not be repeated.

FIG. 2 illustrates an example where the user inputs a motion command using his or her hand 300. In other words, in the example of FIG. 2, the user's hand 300 is set as a pointing part. The embodiment of the invention is not limited to the aforementioned example, but may also include a case where the user gives a motion command by using other body part such as the user's arm or leg.

Also, the pointing part according to the embodiment of the invention may be the wireless input unit 200Q or an object, for example, a rod.

Referring to FIG. 2, if the user moves his/her hand up and down, side to side, the pointer C displayed on the display unit 100 can move up and down, side to side in accordance to the movement of the user's hand 300.

Moreover, if the user rotates the hand 300, the pointer C displayed on the display unit 100 can also rotate accordingly.

If the user makes a predetermined motion, the motion sensing unit 192Q can detect the motion. The motion sensing unit 192Q can use a camera to detect the motion of the user.

The information about the motion of the user's hand sensed by the motion sensing unit 192Q is sent to the controller 170Q of the display unit 10.

The controller 170Q can calculate coordinates of the position at which to display the pointer C from the information about the motion of the user's hand 300. Moreover, the display unit 100 of the display device 10 can display the pointer C so that the pointer C corresponds to the coordinates calculated by the controller 170Q.

As described above, even when the user controls the display device 10 by using his/her motion rather than a remote control device such as the wireless input unit 200Q, a selected region within the display unit 100 corresponding to the pointer C may be zoomed in to be viewed bigger and closer or zoomed out to be viewed smaller and further away in accordance with the user's particular motion.

Moreover, it is possible to move the pointer C displayed on the display unit 100 or select an object displayed on the display unit 100 according to the user's motion; it is still possible to select a predetermined key from an input menu displayed on the display unit 100.

FIGS. 3 to 7 illustrate motion commands. In what follows, descriptions about those parts already described above will be omitted. For example, it is preferable to regard that the motion sensing unit 192Q described above senses the motion of a pointing part described below.

Furthermore, though the following descriptions are based on an assumption that a motion command corresponds to the user's body motion, namely, gesture, the motion command may also be generated by the motion of other object such as the wireless input unit 200Q and a rod.

Figure 3:
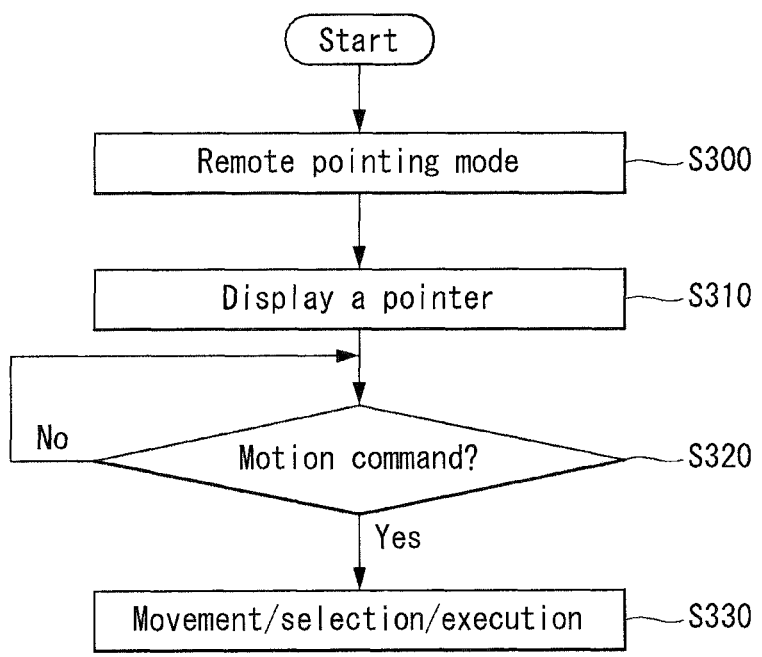
FIGS. 3 to 7 illustrate a motion command.

Referring to FIG. 3, when the display device 10 enters a remote pointing mode in step S300, the display device 10 may display a pointer C on the display unit 100 in step S310.

A remote key input mode may be set when the user directly enters a command through an input means such as the wireless input unit 200Q commanding entrance to the remote pointing mode. Similarly, the remote pointing mode may be set by the user's motion command.

Setting the remote pointing mode can also be done when the user selects a predetermined icon or an object displayed on the display unit 100. The embodiment of the invention is not limited to the cases above, and the method for setting the remote pointing mode may be changed in various ways.

While the pointer C is displayed on the display unit 100, whether a motion command is received may be checked in step S320. From the checking result, if it is determined that a motion command has been input, the pointer C may be moved on the display unit 100 according to the motion command, a predetermined object displayed on the display unit 100 may be selected, or a predetermined function may be carried out in step S330.

In the embodiment disclosed herein, the motion command is regarded as being received when a predetermined pointing part among the user's body moves according to a predetermined pattern in the remote pointing mode.

Figure 4:
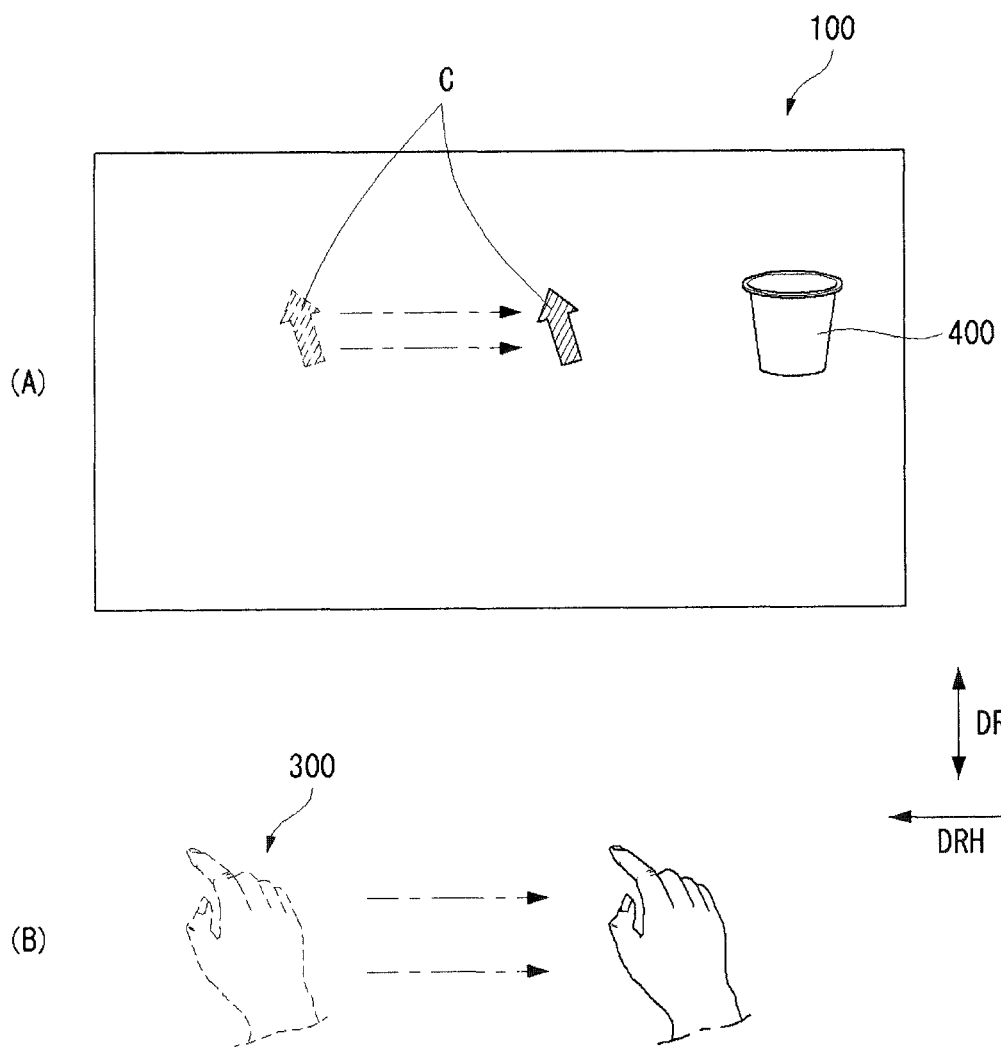

For example, as shown in (B) of FIG. 4, if the user's hand 300 moves along a horizontal direction DRH, more specifically, from left to right, the pointer C displayed on the display unit 100 moves from left to right in accordance with the movement of the user's hand 300 as shown in (A) of FIG. 4.

As shown in FIG. 4, a movement of the user's hand 300 may correspond to the motion command for moving the pointer C.

The example of FIG. 4 is based on an assumption that the user's hand 300, namely, the pointing port moves along the horizontal direction DRH, however the embodiment of the invention is not limited to the assumption. For example, when the hand 300 moves along a vertical direction DRV, the pointer 300 may move along the vertical direction DRV on the display unit 100.

Moreover, when the user's hand 300 rotates or moves along a diagonal direction, it may be decided that a motion command has been received. Further, the pointer C may be rotated or moved along the diagonal direction on the display unit 100.

A motion command following a pattern different from FIG. 4 will be described with reference to FIG. 5.

Figure 5:
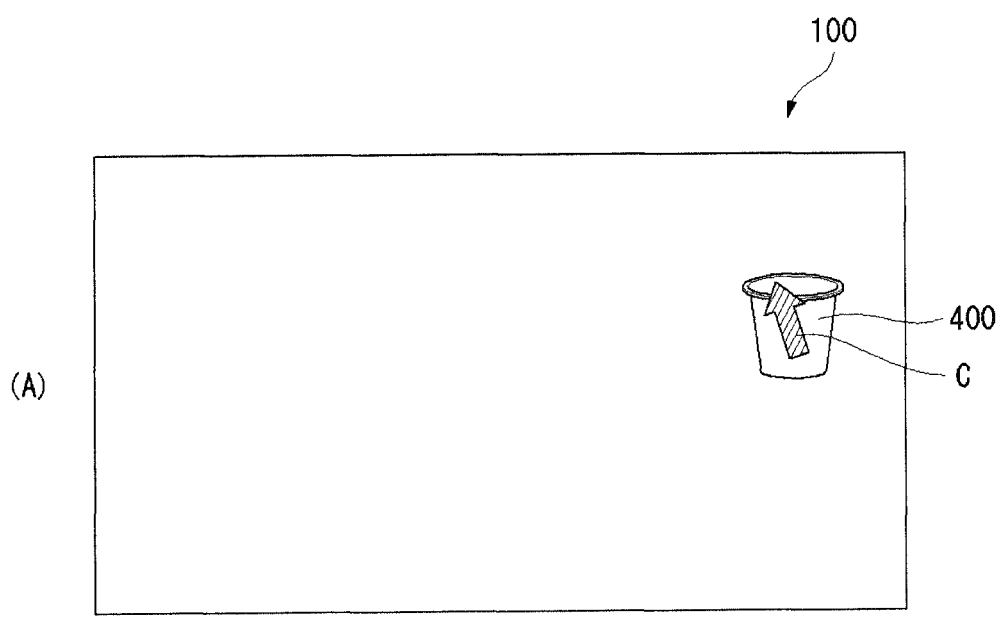
Figure 5:
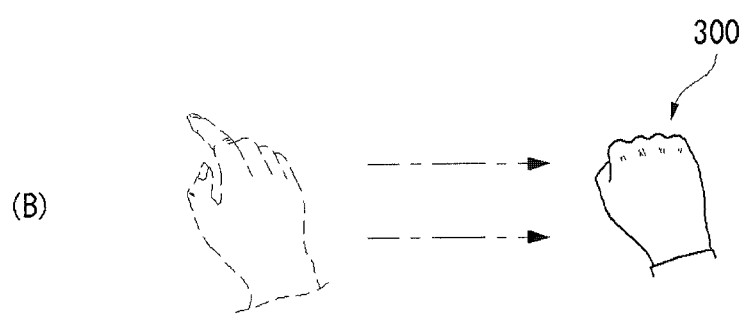

If the index finger of the user's hand 300 is folded while the index finger is stretched as shown in (B) of FIG. 5, an object 400 corresponding to the pointer C from among the objects displayed on the display unit 100 may be selected as shown in (A) of FIG. 5. Similarly, it is also possible to carry out a predetermined function corresponding to the object 400. Or registration information corresponding to the object 400 may be displayed on the display unit 100.

In this way, if the user performs a folding motion while the user's index finger is stretched, a function such as selecting the pointer C corresponding to the object 400 is possible. In this instance, the movement of the user's index finger may correspond to a motion command.

The example of FIG. 5 corresponds to the case where the user's hand 300 is set as the pointing part or the index finger of the user's hand 300 is set as the pointing part.

In the examples of FIGS. 4 and 5, motion commands are generated as the user folds his/her index finger or the user moves his/her hand 300, but the embodiment of the invention is not limited to the examples above.

For example, although not shown, when the user moves his/her hand along a predetermined direction with the palm unfolded, a motion command corresponding to a function of moving the pointer C may be input.

Figure 6:
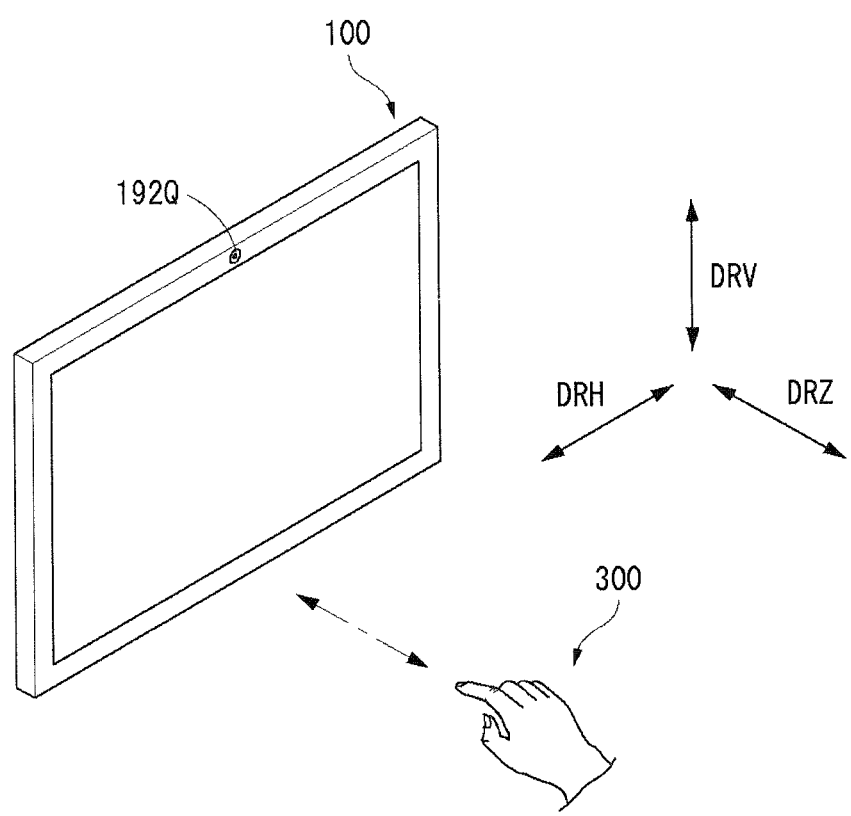

Also, a motion command corresponding to the function of selecting a predetermined object when the user opens and closes his/her hand, Also, as shown in FIG. 6, a motion command may be input when a distance between the pointing part (hand 300) and the display unit 100 is changed.

For example, when the user's hand 300 is set as the pointing part and the user's hand 300 approaches the display unit 100 closer than a predetermined threshold, a motion command corresponding to a function of selecting a predetermined object displayed on the display unit 100 may be generated.

The distance between the pointing part (hand 300) and the display unit 100 may be sensed by the motion sensing unit 192Q.

The motion sensing unit 192Q may be disposed at an edge of the display unit 100.

The distance between the pointing part (hand 300) and the display unit 100 may be a distance between the motion sensing unit 192Q and the pointing part (hand 300).

Further, the motion sensing unit 192Q may sense an angle between the pointing part 300 and the display unit 100.

Figure 7:
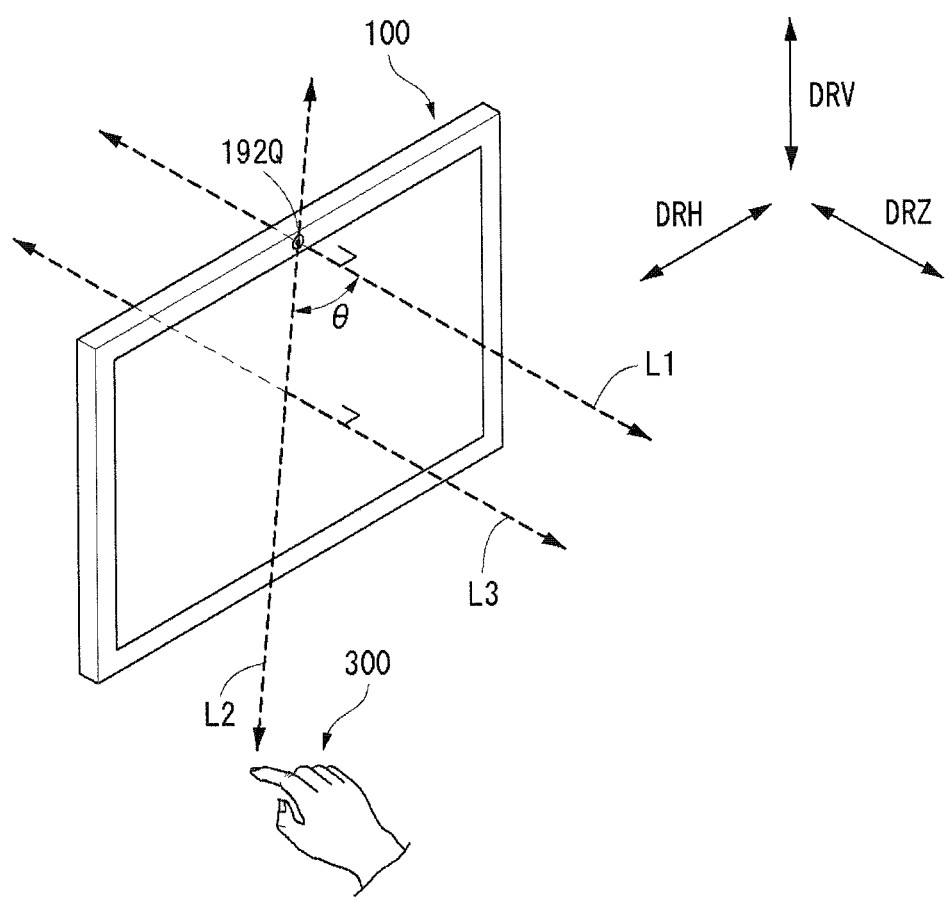

As shown in FIG. 7, the angle between the pointing part 300 and the display unit 100 may indicate an angle θ between a straight line L2 connecting the pointing part 300 and the motion sensing unit 192Q and a straight line L1 vertical to the motion sensing unit 192Q.

The straight line L1 vertical to the motion sensing unit 192Q may be parallel to a straight line L3 vertical to the screen of the display unit 100. Considering this, the angle θ between the pointing part 300 and the display unit 100 may indicate an angle θ between the straight line L2 connecting the pointing part 300 and the motion sensing unit 192Q and the straight line L3 vertical to the screen of the display unit 100.

FIGS. 8 to 16 illustrate a pointing method depending on a distance. In what follows, those descriptions given above will be omitted. In FIGS. 8 to 16, the user's hand 300 is set as the pointing part.

Figure 8:
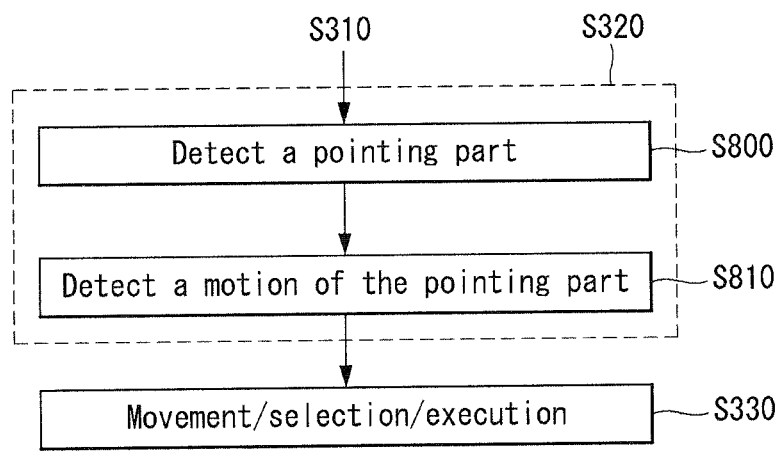
FIGS. 8 to 16 illustrate a pointing method depending on a distance.

Referring to FIG. 8, the step S320 of inputting the motion command may include a step S800 of detecting the pointing part and a step S810 of detecting a motion of the pointing part.

In the step S800 of detecting the pointing part, the pointing part capable of inputting a gesture command may be sensed, and a location of the pointing part may be confirmed.

After detecting the pointing part, a motion of the detected pointing part may be detected in step S810. When the pointing part is a part of the user's body, the gesture command may be detected through the detection of the user's gesture.

Afterwards, the pointer C displayed on the screen of the display unit 100 may move in accordance with the motion of the pointing part, i.e., the motion command in step S330.

In the step S330, a predetermined object displayed on the display unit 100 may be selected, or a predetermined function may be carried out, in addition to the movement of the pointer C.

In what follows, the case where the pointer C moves on the screen of the display unit 100 in step S330 is described as an example.

In a step of moving the pointer C, a moving distance of the pointer C may vary depending on a distance from the pointing part.

In the embodiment disclosed herein, the distance from the pointing part may be a distance between the pointing part and the display unit or a distance between the motion sensing unit 192Q and the pointing part.

Figure 9:
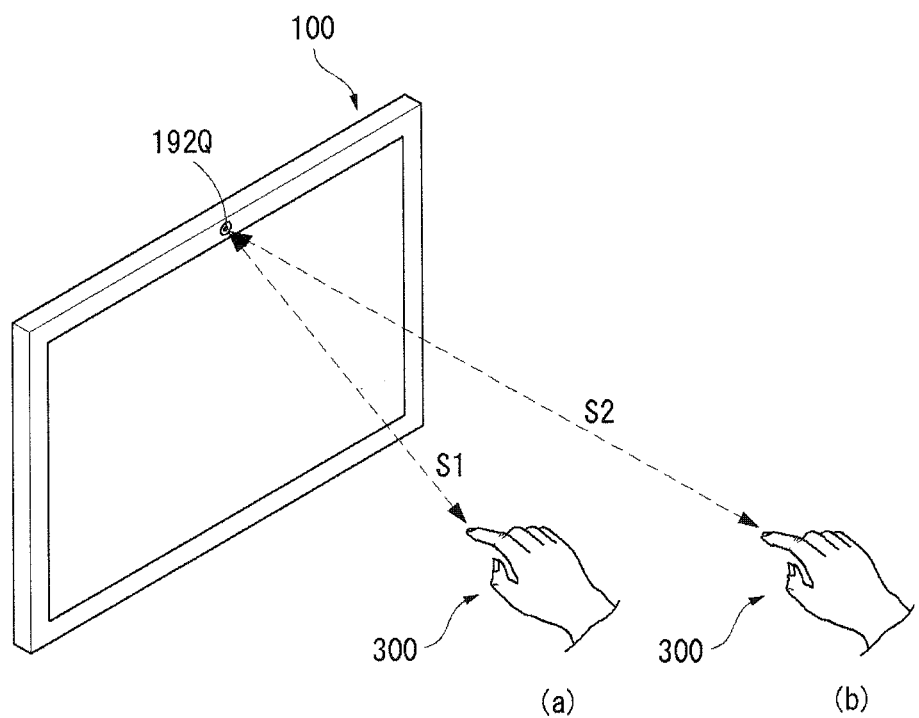

For example, a motion of the pointer C corresponding to a motion of the pointing part 300 when the distance between the pointing part, i.e., the user's hand 300 and the motion sensing unit 192Q is a first distance S1 as shown in (a) of FIG. 9 may be different from a motion of the pointer C corresponding to a motion of the pointing part 300 when the distance between the pointing part 300 and the motion sensing unit 192Q is a second distance S2 different from the first distance S1 as shown in (b) of FIG. 9.

Figure 10:
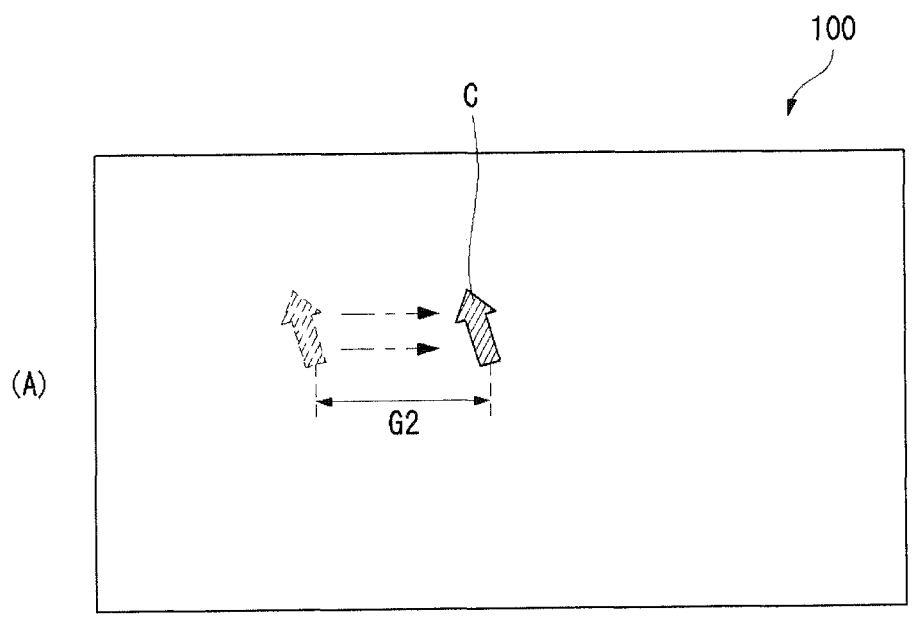
Figure 10:
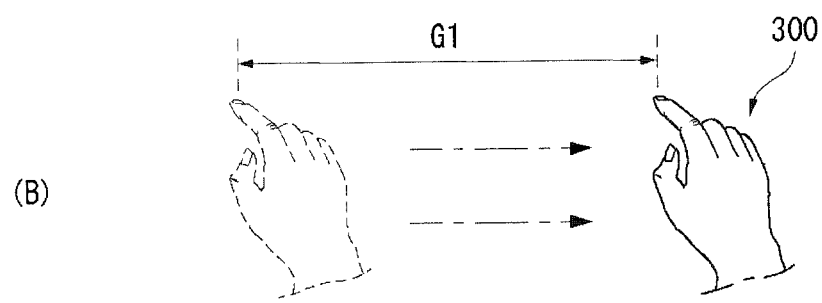

More specifically, it is assumed that the pointing part 300 moves by a first interval G1 as shown in (B) of FIG. 10 when the distance between the pointing part 300 and the motion sensing unit 192Q is the first distance S1 as shown in (a) of FIG. 9.

In this instance, as shown in (A) of FIG. 10, the pointer C may move by a second interval G2 on the display unit 100.

Figure 11:
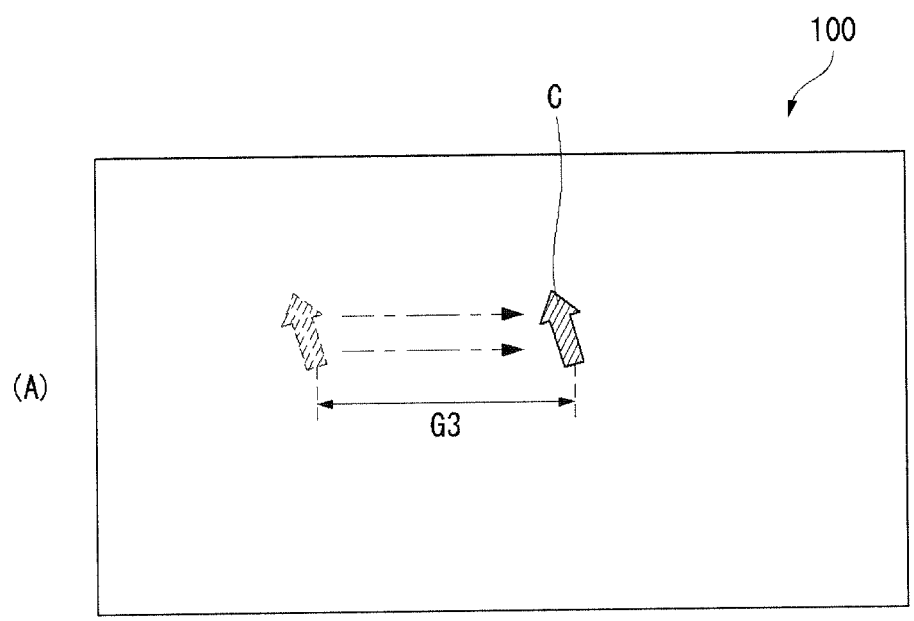
Figure 11:
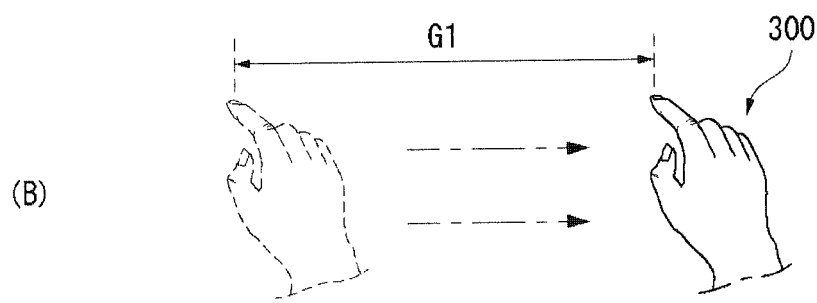

Unlike this, when the pointing part 300 moves by the first interval G1 as shown in (B) of FIG. 11 in a state where the distance between the pointing part 300 and the motion sensing unit 192Q is the second distance S2 greater than the first distance S1 as shown in (b) of FIG. 9, the pointer C may move by a third interval G3 greater than the second interval G2 on the display unit 100 as shown in (A) of FIG. 11.

Namely, as the distance between the pointing part 300 and the motion sensing unit 192Q increases, a moving distance of the pointer C with respect to a moving distance of the pointing part 300 may increase.

When the user is close to the display unit 100, the size of the display unit 100 the user perceives may be relatively large. On the contrary, when the user is far away from the display unit 100, the size of the display unit 100 the user perceives may be relatively small.

Accordingly, even when the distance between the pointing part 300 and the motion sensing unit 192Q sufficiently increases, the user can more easily recognize and control the motion of the pointer C by increasing the moving distance of the pointer C with respect to the moving distance of the pointing part 300.

Figure 12:
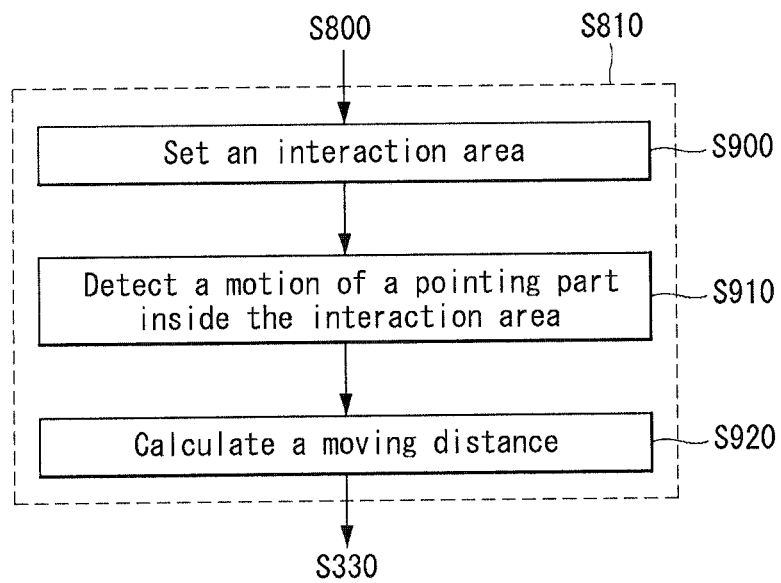

As shown in FIG. 12, the step S810 of detecting the motion of the pointing part 300 may include a step S900 of setting an interaction area IAA and a step S910 of detecting the motion of the pointing part 300 inside the interaction area IAA.

Figure 13:
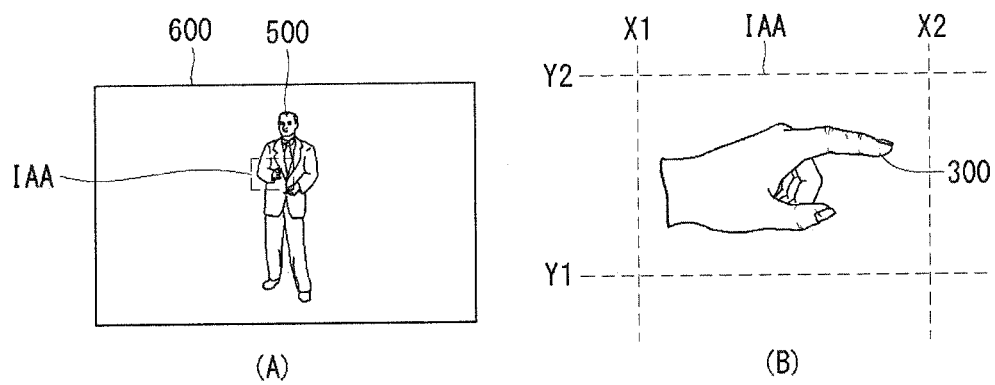

For example, as shown in (A) of FIG. 13, the step S900 of setting the interaction area IAA may set the interaction area IAA from an image 600 including a user 500.

As shown in (B) of FIG. 13, the interaction area IAA may include the pointing part 300. In what follows, it is assumed that a horizontal coordinate and a vertical coordinate of the interaction area IAA are X1-X2 and Y1-Y2, respectively. In the embodiment of the invention, the coordinates of the interaction area IAA are arbitrarily set and thus may be variously changed.

The interaction area IAA may be an area for mapping the motion of the pointing part 300 to the motion of the pointer C.

Hence, a moving distance of the pointer C may be set as a ratio of a moving distance of the pointing part 300 to the size of the interaction area IAA.

Figure 14:
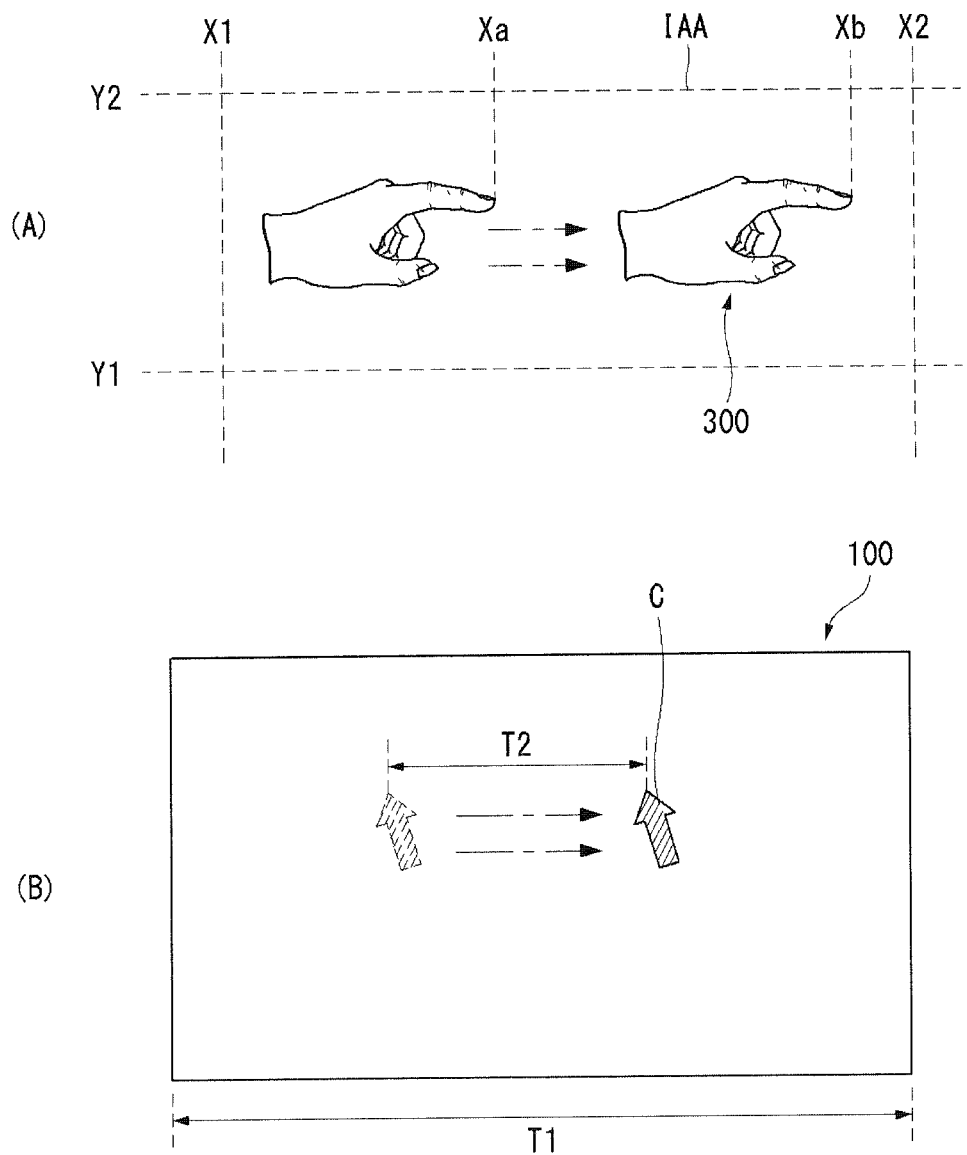

For example, as shown in (A) of FIG. 14, it is assumed that the pointing part 300 positioned at a horizontal coordinate Xa inside the interaction area IAA moves to a horizontal coordinate Xb.

In this instance, the ratio of the moving distance of the pointing part 300 to the size of the interaction area IAA in a horizontal direction may be (Xb−Xa)/(X2−X1).

As shown in (B) of FIG. 14, the pointer C may move by T2 in the horizontal direction correspondingly to the motion of the pointing part 300 under these conditions.

In the embodiment disclosed herein, assuming the size of the display unit 100 in the horizontal direction is denoted as T1, T2/T1 may be almost the same as (Xb−Xa)/(X2−X1).

Namely, the motion of the pointing part 300 inside the interaction area IAA is mapped to the motion of the pointer C on the screen of the display unit 100.

Further, the step S810 of detecting the motion of the pointing part 300 may further include a step S920 of calculating the moving distance of the pointer C on the display unit 100 depending on the moving distance of the pointing part 300.

In the embodiment disclosed herein, calculating the moving distance of the pointer C on the display unit 100 may be performed by mapping the motion of the pointing part 300 inside the interaction area IAA to the motion of the pointer C on the display unit 100.

It may be preferable, but not required, that the size of the interaction area IAA is differently set depending on the distance between the motion sensing unit 192Q and the pointing part 300, so as to vary the moving distance of the pointer C on the screen of the display unit 100 depending on the distance between the motion sensing unit 192Q and the pointing part 300.

Figure 15:
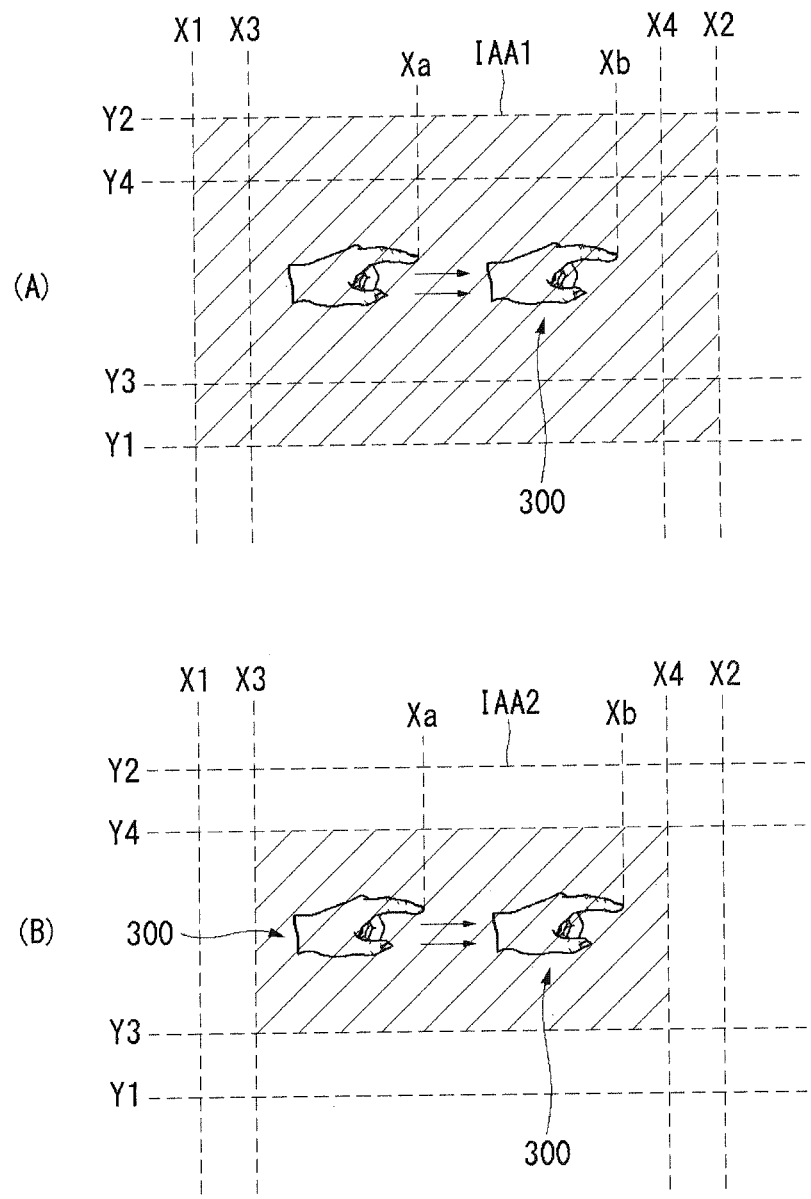

For example, when the distance between the motion sensing unit 192Q and the pointing part 300 is the first distance S1 as shown in (a) of FIG. 9, a first interaction area IAA1 having a horizontal coordinate of X1-X2 and a vertical coordinate of Y1-Y2 may be set as shown in (A) of FIG. 15.

On the other hand, when the distance between the motion sensing unit 192Q and the pointing part 300 is the second distance S2 greater than the first distance S1 as shown in (b) of FIG. 9, a second interaction area IAA2 having a horizontal coordinate of X3-X4 and a vertical coordinate of Y3-Y4 may be set as shown in (B) of FIG. 15.

A size of the second interaction area IAA2 may be less than a size of the first interaction area IAA1.

As described above, when the size of the second interaction area IAA2 is less than the size of the first interaction area IAA1, the moving distance of the pointer C on the screen of the display unit 100 may vary depending on the distance between the motion sensing unit 192Q and the pointing part 300.

For example, as shown in (A) of FIG. 15, when the pointing part 300 moves by Xb-Xa in the horizontal direction inside the first interaction area IAA1, a ratio of a moving distance of the pointing part 300 to the size of the first interaction area IAA1 in the horizontal direction may be (Xb−Xa)/(X2−X1).

On the other hand, as shown in (B) of FIG. 15, when the pointing part 300 moves by Xb-Xa in the horizontal direction inside the second interaction area IAA2, a ratio of a moving distance of the pointing part 300 to the size of the second interaction area IAA2 in the horizontal direction may be (Xb−Xa)/(X3−X4).

Because (X3−X4) is less than (X2−X1), a moving distance of the pointer C on the screen of the display unit 100 in (B) of FIG. 15 may be greater than a moving distance of the pointer C on the screen of the display unit 100 in (A) of FIG. 15.

Figure 16:
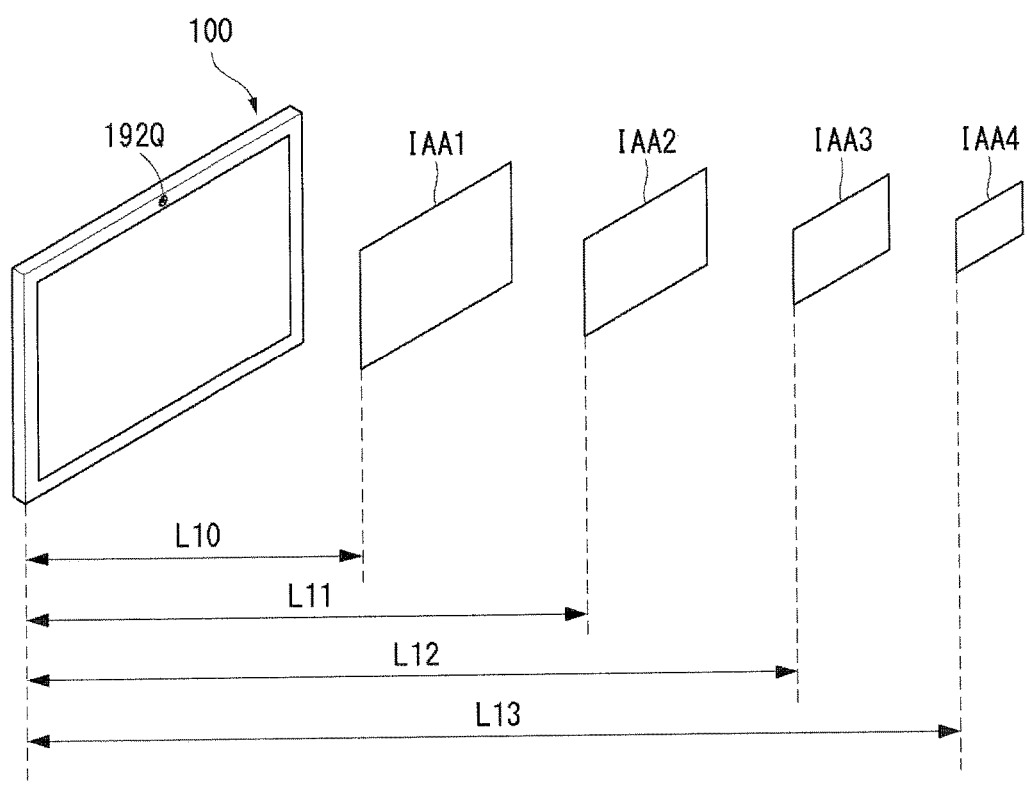

Referring to FIG. 16, the first interaction area IAA1 may be used within a tenth distance L10 from the motion sensing unit 192Q, the second interaction area IAA2 smaller than the first interaction area IAA1 may be used between the tenth distance L10 and an eleventh distance L11, a third interaction area IAA3 smaller than the second interaction area IAA2 may be used between the eleventh distance L11 and a twelfth distance L12, and a fourth interaction area IAA4 smaller than the third interaction area IAA3 may be used between the twelfth distance L12 and a thirteenth distance L13.

FIGS. 17 to 35 illustrate a pointing method depending on an angle. In what follows, those descriptions given above will be omitted.

In the embodiment of the invention, in the step of moving the pointer C, the moving distance of the pointer C may vary depending on an angle between the pointing part 300 and the display unit 100.

In the embodiment disclosed herein, as described above in detail with reference to FIG. 7, the angle between the pointing part 300 and the display unit 100 may indicate the angle θ between the straight line L2 connecting the pointing part 300 and the motion sensing unit 192Q and the straight line L1 vertical to the motion sensing unit 192Q.

The angle θ between the pointing part 300 and the display unit 100 may be an angle between the pointing part 300 and the motion sensing unit 192Q.

Figure 17:
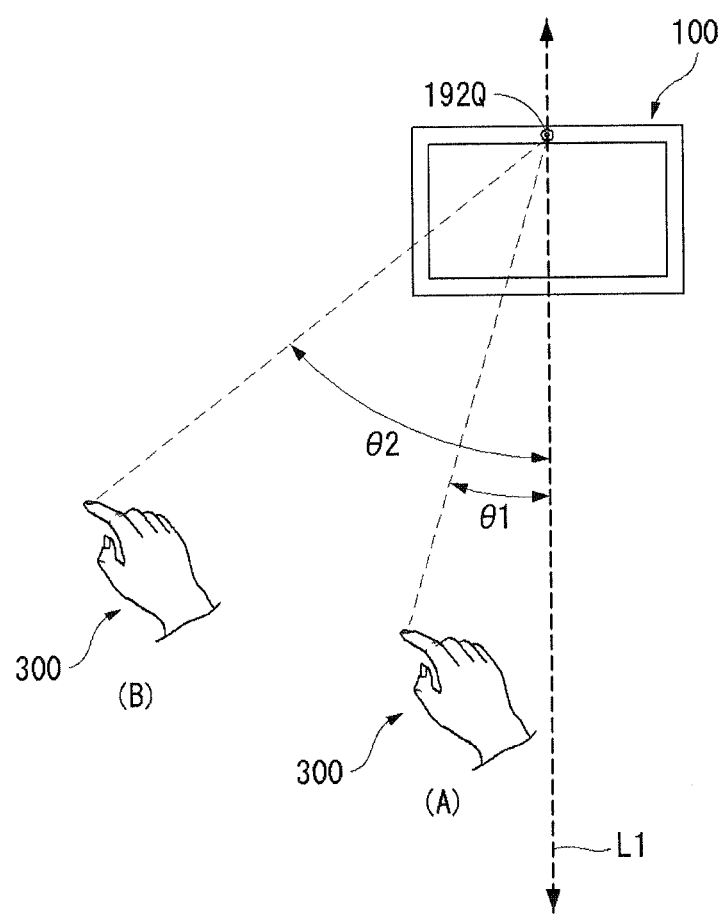
FIGS. 17 to 35 illustrate a pointing method depending on an angle.

For example, a motion of the pointer C corresponding to a motion of the pointing part 300 when the angle between the pointing part, i.e., the user's hand 300 and the motion sensing unit 192Q is a first angle θ1 as shown in (A) of FIG. 17 may be different from a motion of the pointer C corresponding to a motion of the pointing part 300 when the angle between the pointing part 300 and the motion sensing unit 192Q is a second angle θ2 greater than the first angle θ1 as shown in (B) of FIG. 17.

More specifically, when the angle θ1 between the pointing part 300 and the motion sensing unit 192Q is relatively small as shown in (A) of FIG. 17, a ratio G2/G1 of the moving distance G2 of the pointer C on the display unit 100 to the moving distance G1 of the pointing part 300 as shown in FIG. 10 may relatively decrease.

On the other hand, when the angle θ2 between the pointing part 300 and the motion sensing unit 192Q is relatively large as shown in (B) of FIG. 17, a ratio G3/G1 of the moving distance G3 of the pointer C on the display unit 100 to the moving distance G1 of the pointing part 300 as shown in FIG. 11 may be greater than the ratio G2/G1.

Namely, as the angle between the pointing part 300 and the motion sensing unit 192Q increases, the moving distance of the pointer C with respect to the moving distance of the pointing part 300 may increase.

For example, the size of the display unit 100 the user, which is positioned at the side of the display unit 100, perceives may be relatively smaller than the size of the display unit 100 the user, which is positioned in front of the display unit 100, perceives.

Accordingly, even when the angle between the pointing part 300 and the motion sensing unit 192Q sufficiently increases, the user can more easily recognize and control the motion of the pointer C by increasing the moving distance of the pointer C with respect to the moving distance of the pointing part 300.

When the distance between the motion sensing unit 192Q and the pointing part 300 is less than a previously set reference distance R1, the moving distance of the pointer C on the display unit 100 with respect to the moving distance of the pointing part 300 may be the same irrespective of the angle between the motion sensing unit 192Q and the pointing part 300.

Figure 18:
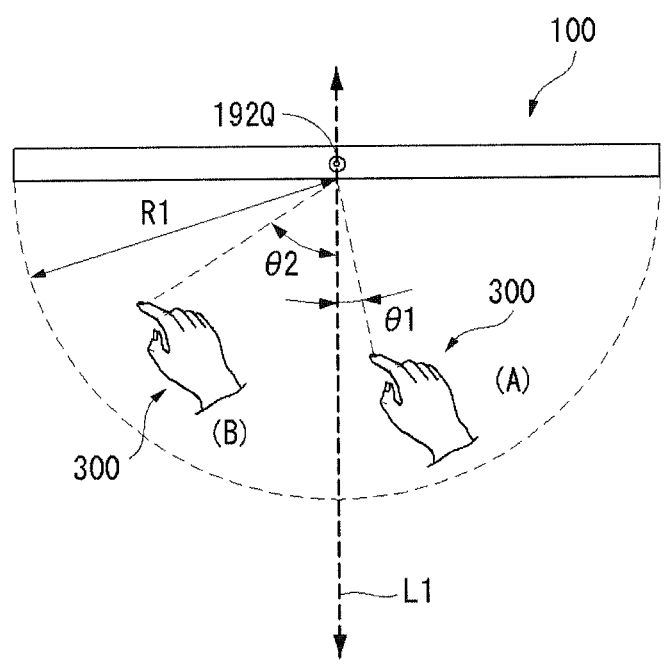

In other words, when the distance between the motion sensing unit 192Q and the pointing part 300 is less than the previously set reference distance R1, the moving distance of the pointer C on the display unit 100 corresponding to the moving distance of the pointing part 300 when the angle between the motion sensing unit 192Q and the pointing part 300 is the first angle θ1 as shown in (A) of FIG. 18 may be the same as the moving distance of the pointer C with respect to the moving distance of the pointing part 300 when the angle between the motion sensing unit 192Q and the pointing part 300 is the second angle θ2 as shown in (B) of FIG. 18.

Unlike this, when the distance between the motion sensing unit 192Q and the pointing part 300 is equal to or greater than the previously set reference distance R1, the motion of the pointer C corresponding to the moving distance of the pointing part 300 may vary depending on the angle between the pointing part 300 and the display unit 100.

Figure 19:
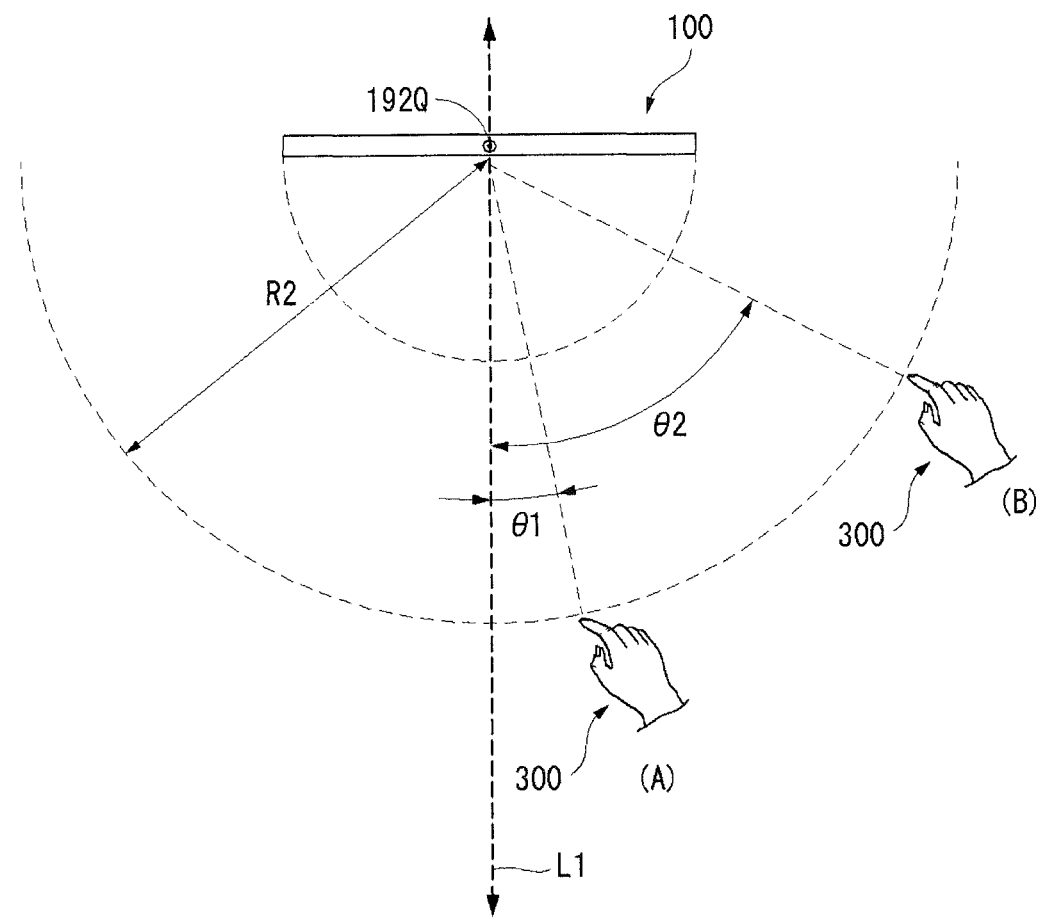

As shown in (A) of FIG. 19, suppose the distance between the motion sensing unit 192Q and the pointing part 300 is a first distance R2 equal to or greater than the reference distance R1 and the angle between the pointing part 300 and the display unit 100 is the first angle θ1.

In this instance, when the pointing part 300 moves by the first interval G1 as shown in (B) of FIG. 10, the pointer C may move by the second interval G2 on the display unit 100 as shown in (A) of FIG. 10.

As shown in (B) of FIG. 19, suppose the distance between the motion sensing unit 192Q and the pointing part 300 is the first distance R2 equal to or greater than the reference distance R1, and the angle between the pointing part 300 and the display unit 100 is the second angle θ2 greater than the first angle θ1.

In this instance, when the pointing part 300 moves by the first interval G1 as shown in (B) of FIG. 11, the pointer C may move by the third interval G3 greater than the second interval G2 on the display unit 100 as shown in (A) of FIG. 11.

As described above, a shape and/or the size of the interaction area IAA may be differently adjusted depending on the angle between the motion sensing unit 192Q and the pointing part 300, so as to differently adjust the motion of the pointer C depending on the angle between the motion sensing unit 192Q and the pointing part 300.

Figure 20:
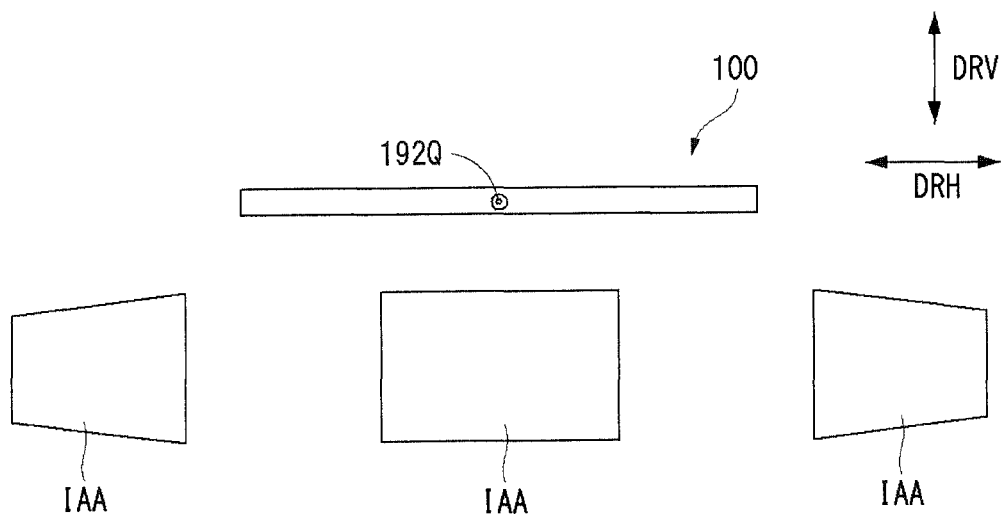

For example, as shown in FIG. 20, when the pointing part 300 is positioned in front of the motion sensing unit 192Q, the interaction area IAA may be configured as an approximately rectangular shape. When the pointing part 300 is positioned at the side of the motion sensing unit 192Q, the interaction area IAA may be configured as a trapezoid shape, of which the base faces the motion sensing unit 192Q.

This is described below with reference to FIGS. 21 to 26. In what follows, coordinates of the interaction area IAA are arbitrarily set, and thus the embodiment of the invention is not limited to the following coordinates of the interaction area IAA.

Figure 21:
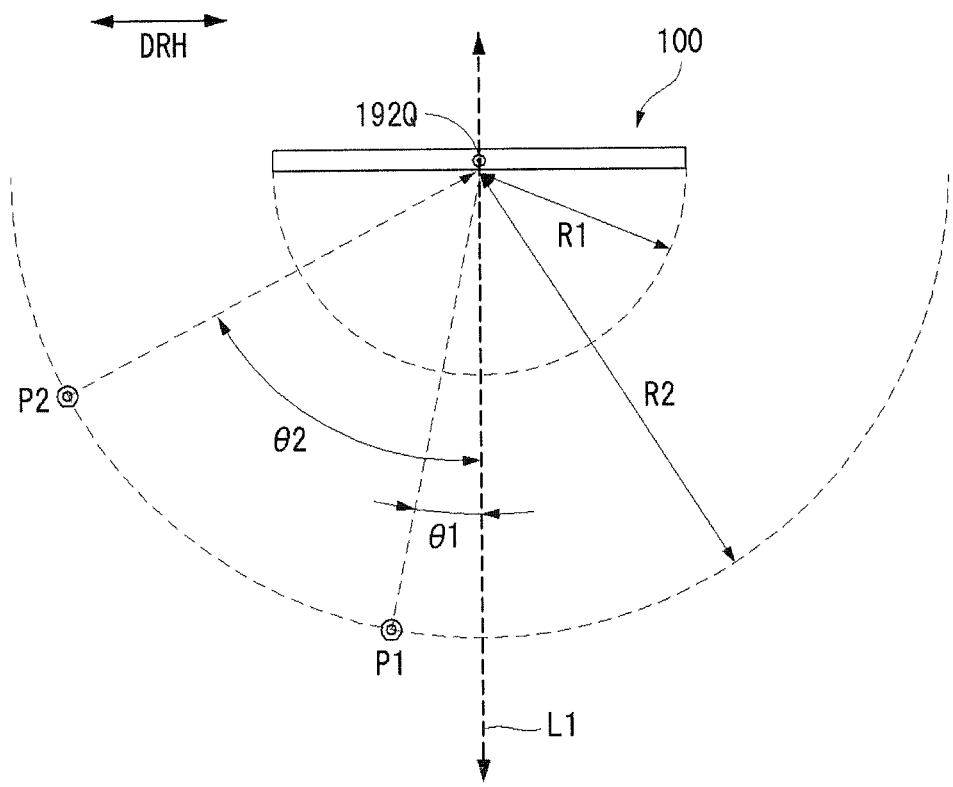

As shown in FIG. 21, a first position P1 and a second position P2 are separated from the motion sensing unit 192Q by the first distance R2 greater than the reference distance R1, an angle between the first position P1 and the motion sensing unit 192Q is a first angle θ1, and an angle between the second position P2 and the motion sensing unit 192Q is a second angle θ2 greater than the first angle θ1. Further, the first position P1 and the second position P2 may be positioned on the left side of the motion sensing unit 192Q.

Figure 22:
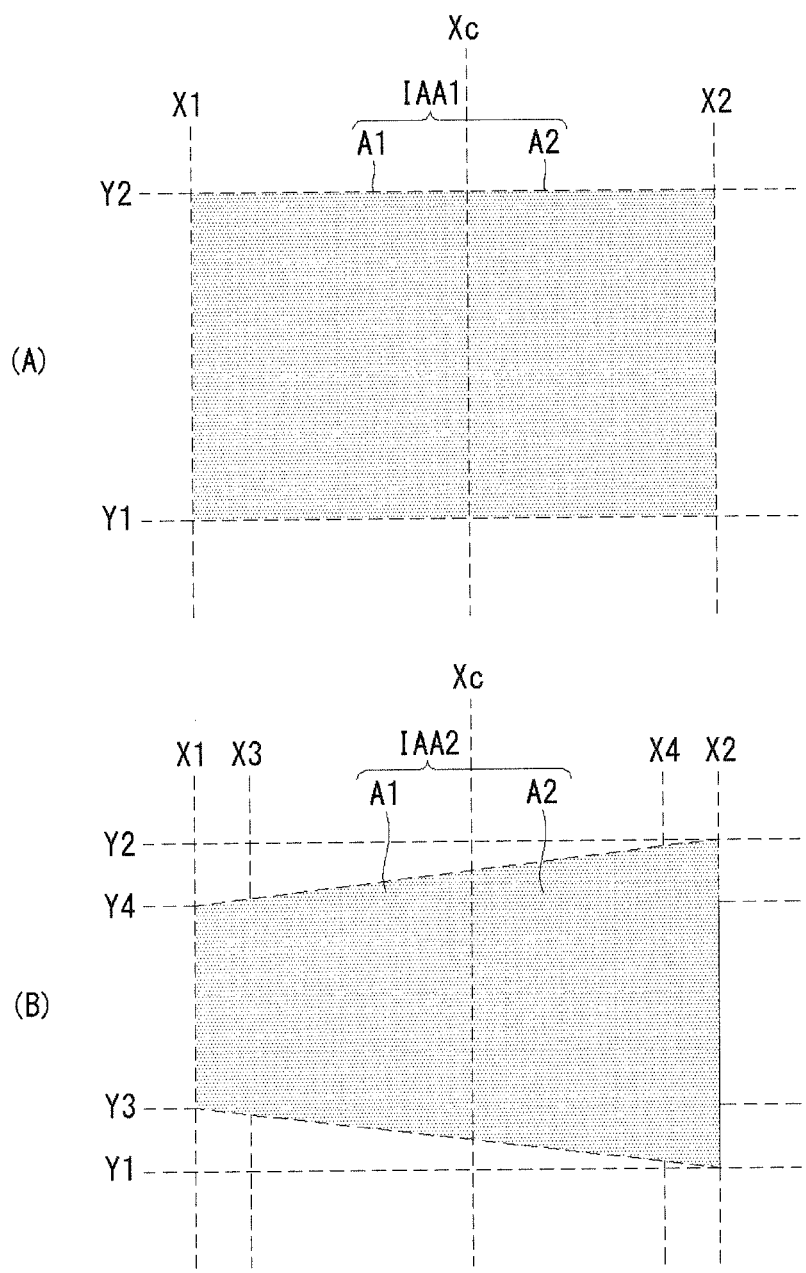

As shown in (A) of FIG. 22, when the pointing part 300 is positioned at the first position P1, a first interaction area IAA1 having a horizontal coordinate of X1-X2 and a vertical coordinate of Y1-Y2 may be set.

The first interaction area IAA1 may be divided into a first area A1 and a second area A2 based on a central axis Xc in the horizontal direction DRH. The first area A1 and the second area A2 of the first interaction area IAA1 may almost have the same size.

Because a horizontal coordinate Xc in the first interaction area IAA1 is the central axis, Xc-X1 may be substantially the same as X2-Xc.

As shown in (B) of FIG. 22, when the pointing part 300 is positioned at the second position P2, a second interaction area IAA2 smaller than the first interaction area IAA1 may be set.

The second interaction area IAA2 may be divided into a first area A1 and a second area A2 based on the central axis Xc in the horizontal direction DRH. The first area A1 and the second area A2 of the second interaction area IAA2 may have different sizes. Preferably, the size of the second area A2 close to the motion sensing unit 192Q may be greater than the size of the first area A1.

The size of the first area A1 of the first interaction area IAA1 may be greater than the size of the first area A1 of the second interaction area IAA2, or the size of the second area A2 of the first interaction area IAA1 may be greater than the size of the second area A2 of the second interaction area IAA2. Hence, the size of the first interaction area IAA1 may be greater than the size of the second interaction area IAA2.

Further, a difference between the sizes of the first area A1 and the second area A2 of the second interaction area IAA2 may be greater than a difference between the sizes of the first area A1 and the second area A2 of the first interaction area IAA1.

As the second interaction area IAA2 is far away from the motion sensing unit 192Q, the second interaction area IAA2 may include a portion having a decreasing width in the vertical direction.

The second interaction area IAA2 may have a trapezoid shape, of which the base X2 faces the motion sensing unit 192Q. A vertical coordinate of an upper side of the second interaction area IAA2 may be Y3-Y4, and a vertical coordinate of the base of the second interaction area IAA2 may be Y1-Y2.

Hence, the distance of the pointer C corresponding to the moving distance of the pointing part 300 when the pointing part 300 moves from the first area A1 of the second interaction area IAA2 may be greater than the distance of the pointer C corresponding to the moving distance of the pointing part 300 when the pointing part 300 moves from the second area A2 of the second interaction area IAA2.

The fact that the pointing part 300 is positioned in the first area A1 of the second interaction area IAA2 may mean that the angle between the pointing part 300 and the motion sensing unit 192Q is relatively large. Further, the fact that the pointing part 300 is positioned in the second area A2 of the second interaction area IAA2 may mean that the angle between the pointing part 300 and the motion sensing unit 192Q is relatively small.

Figure 23:
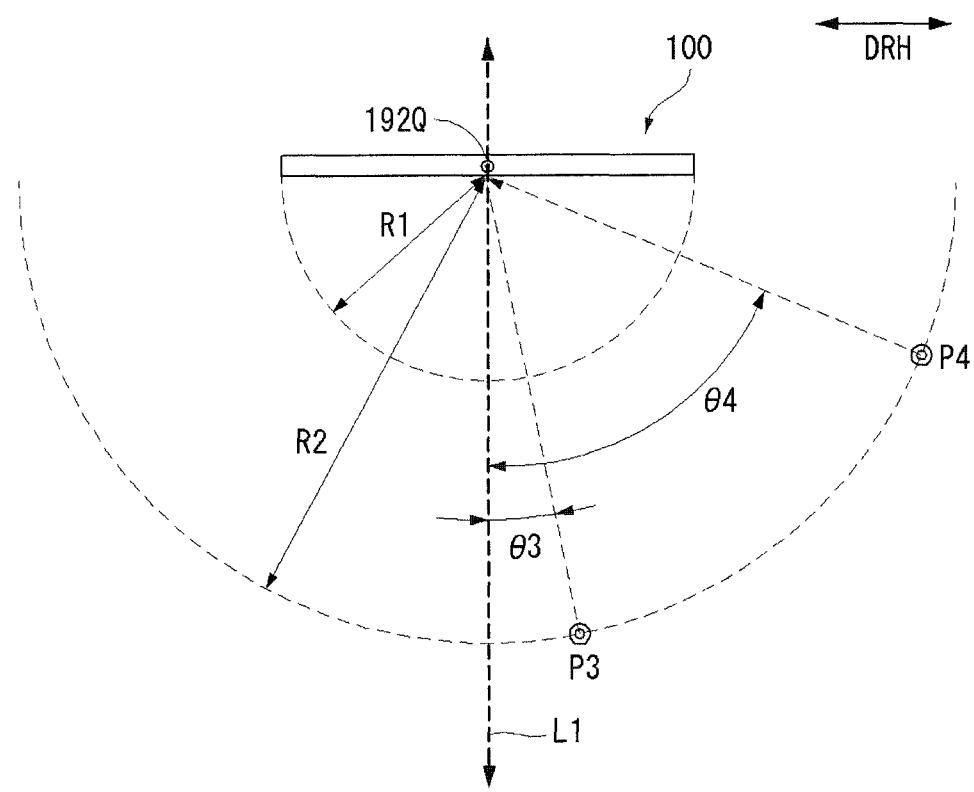

As shown in FIG. 23, a third position P3 and a fourth position P4 are separated from the motion sensing unit 192Q by the first distance R2 greater than the reference distance R1, an angle between the third position P3 and the motion sensing unit 192Q is a third angle θ3, and an angle between the fourth position P4 and the motion sensing unit 192Q is a fourth angle θ4 greater than the third angle θ3. Further, the third position P3 and the fourth position P4 may be positioned on the right side of the motion sensing unit 192Q.

Figure 24:
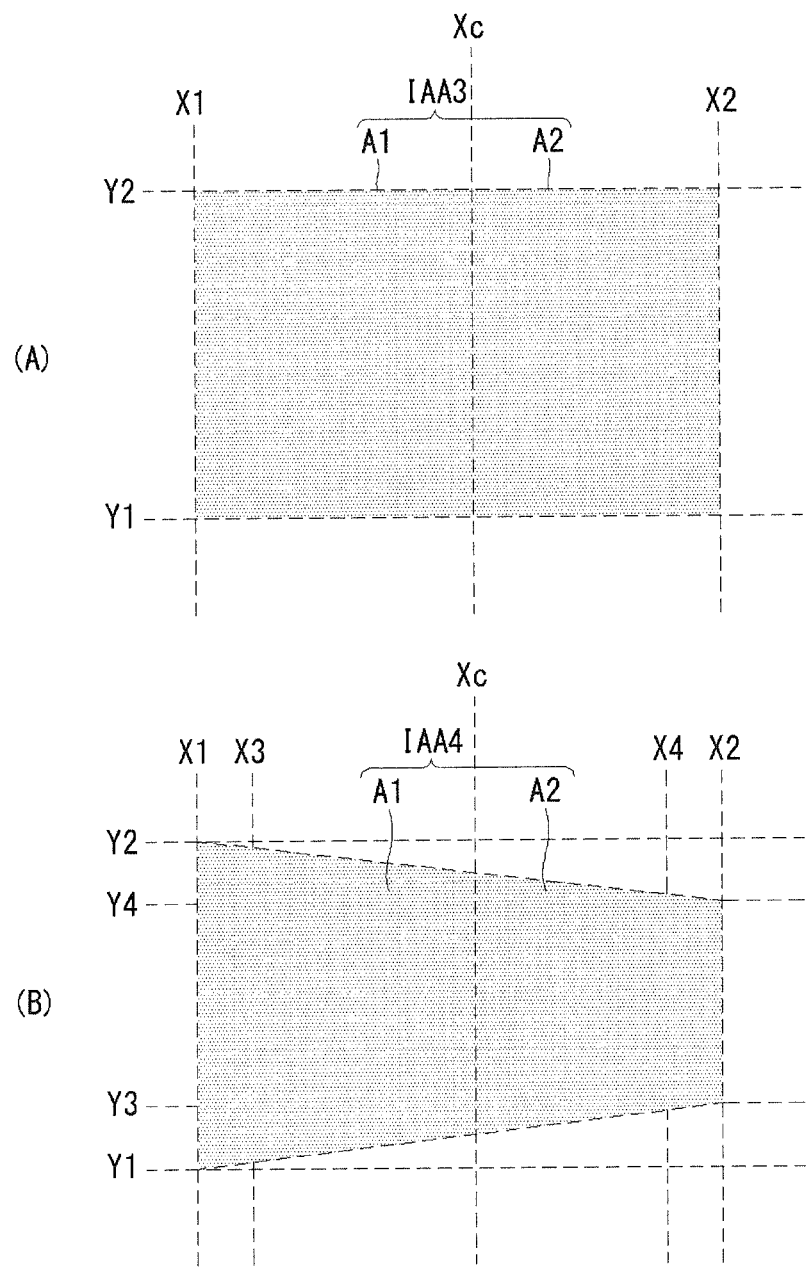

As shown in (A) of FIG. 24, when the pointing part 300 is positioned at the third position P3, a third interaction area IAA3 having a horizontal coordinate of X1-X2 and a vertical coordinate of Y1-Y2 may be set.

The third interaction area IAA3 may be divided into a first area A1 and a second area A2 based on a central axis Xc in the horizontal direction DRH. The first area A1 and the second area A2 of the third interaction area IAA3 may almost have the same size.

As shown in (B) of FIG. 24, when the pointing part 300 is positioned at the fourth position P4, a fourth interaction area IAA4 smaller than the third interaction area IAA3 may be set.

The fourth interaction area IAA4 may be divided into a first area A1 and a second area A2 based on the central axis Xc in the horizontal direction DRH. The first area A1 and the second area A2 of the fourth interaction area IAA4 may have different sizes. Preferably, the size of the first area A1 close to the motion sensing unit 192Q may be greater than the size of the second area A2.

The size of the first area A1 of the third interaction area IAA3 may be greater than the size of the first area A1 of the fourth interaction area IAA4, or the size of the second area A2 of the third interaction area IAA3 may be greater than the size of the second area A2 of the fourth interaction area IAA4. Hence, the size of the third interaction area IAA3 may be greater than the size of the fourth interaction area IAA4.

As the fourth interaction area IAA4 is far away from the motion sensing unit 192Q, the fourth interaction area IAA4 may include a portion having a decreasing width in the vertical direction.

The fourth interaction area IAA4 may have a trapezoid shape, of which the base X1 faces the motion sensing unit 192Q. A vertical coordinate of an upper side of the fourth interaction area IAA4 may be Y3-Y4, and a vertical coordinate of the base of the fourth interaction area IAA4 may be Y1-Y2.

Hence, the distance of the pointer C corresponding to the moving distance of the pointing part 300 when the pointing part 300 moves from the first area A1 of the fourth interaction area IAA4 may be smaller than the distance of the pointer C corresponding to the moving distance of the pointing part 300 when the pointing part 300 moves from the second area A2 of the fourth interaction area IAA4.

The fact that the pointing part 300 is positioned in the second area A2 of the fourth interaction area IAA4 may mean that the angle between the pointing part 300 and the motion sensing unit 192Q is relatively large. Further, the fact that the pointing part 300 is positioned in the first area A1 of the fourth interaction area IAA4 may mean that the angle between the pointing part 300 and the motion sensing unit 192Q is relatively small.

As described above, the shape of the interaction area IAA when the pointing part 300 is positioned on the left side of the motion sensing unit 192Q may be different from the shape of the interaction area IAA when the pointing part 300 is positioned on the right side of the motion sensing unit 192Q.

In the above description, the second interaction area IAA2 and the fourth interaction area IAA4 may be symmetrical to each other with respect to the motion sensing unit 192Q.

When the pointing part 300 is positioned at the side (for example, the left or right side) of the motion sensing unit 192Q, the moving distance of the pointer C with respect to the moving distance of the pointing part 300 in the vertical direction may be adjusted.

For example, as shown in FIG. 21, suppose a horizontal angle between the pointing part 300 and the motion sensing unit 192Q is the first angle θ1, namely, the pointing part 300 is positioned at the first position P1.

Figure 25:
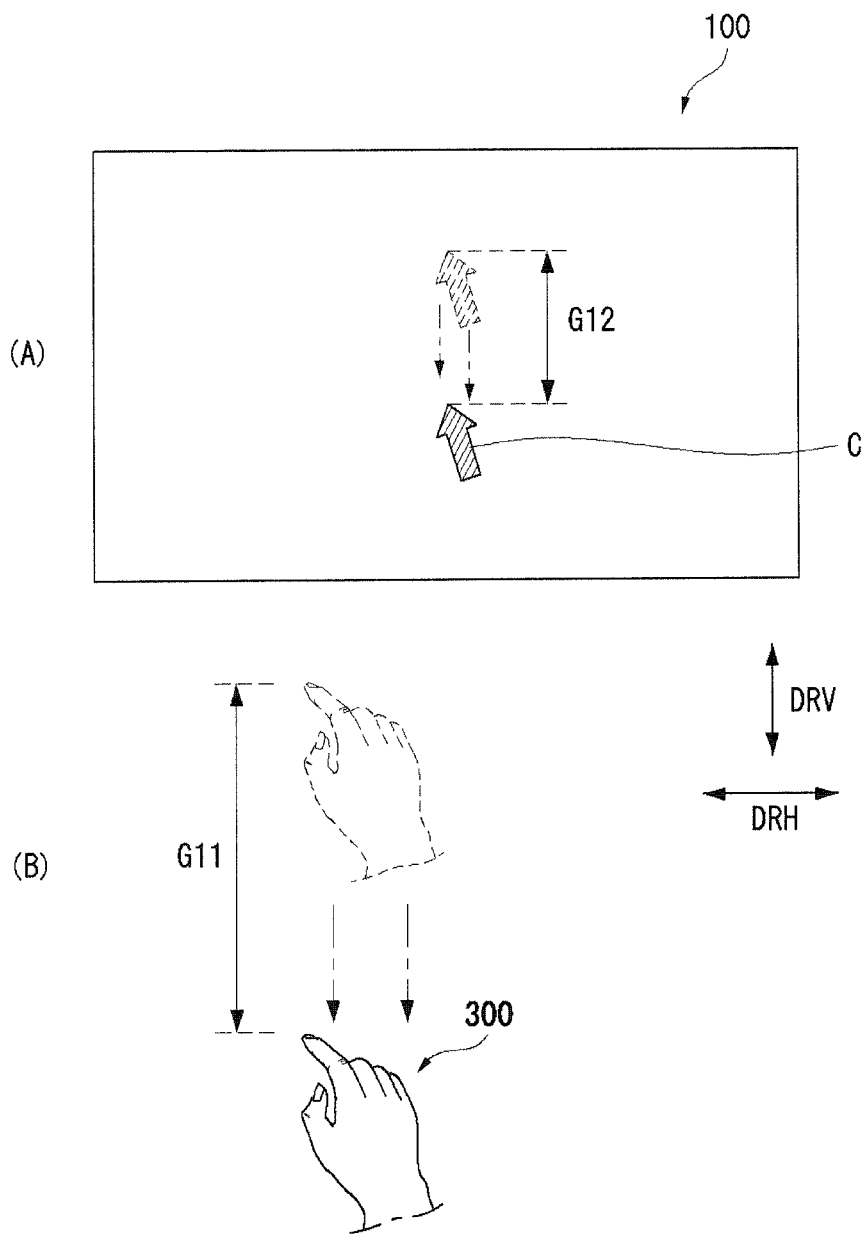

In this instance, as shown in FIG. 25, a ratio G12/G11 of a moving distance G12 of the pointer C on the display unit 100 in the vertical direction DRV to a moving distance G11 of the pointing part 300 in the vertical direction DRV may relatively decrease.

Unlike this, as shown in FIG. 21, suppose the horizontal angle between the pointing part 300 and the motion sensing unit 192Q is the second angle θ2 greater than the first angle θ1, namely, the pointing part 300 is positioned at the second position P2.

Figure 26:
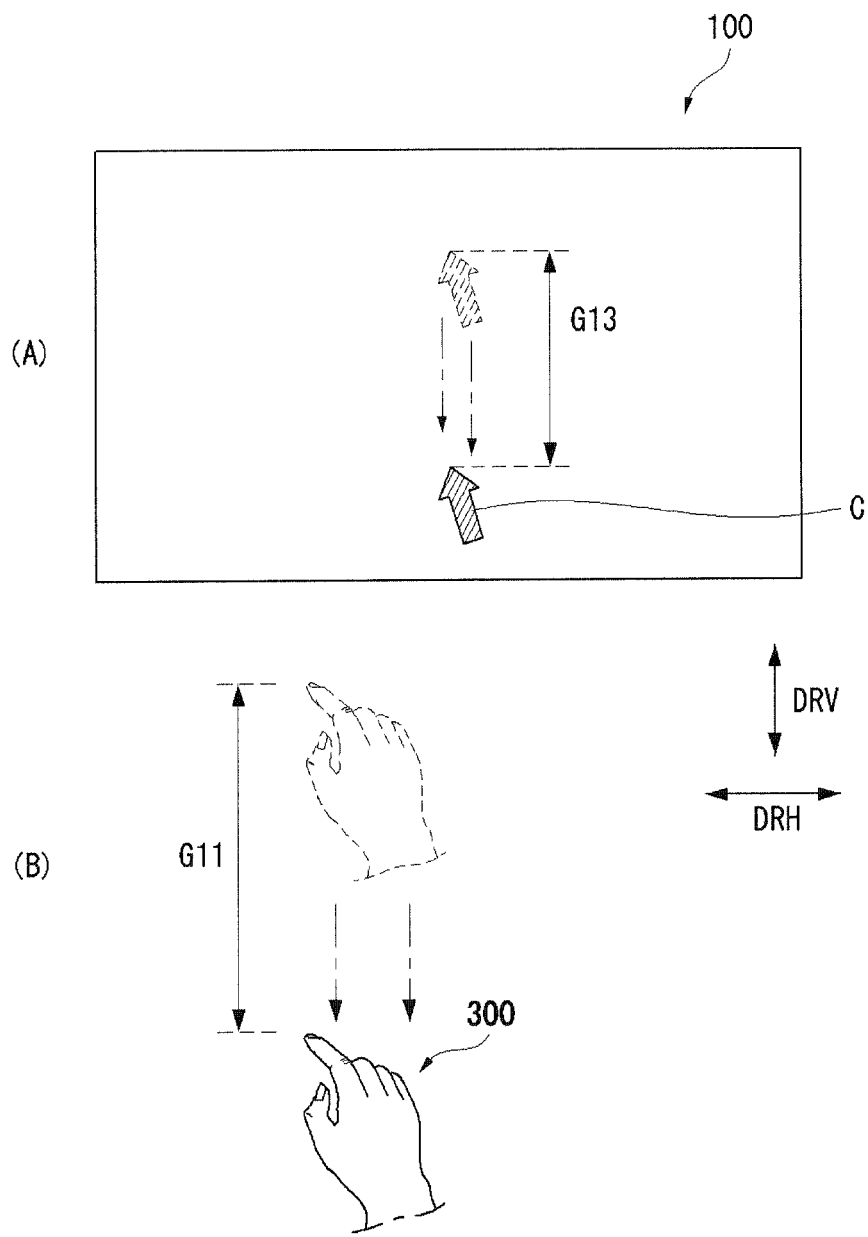

In this instance, as shown in FIG. 26, a ratio G13/G11 of a moving distance G13 of the pointer C on the display unit 100 in the vertical direction DRV to a moving distance G11 of the pointing part 300 in the vertical direction DRV may be greater than the ratio G12/G11.

In other words, when a horizontal angle between the pointing part 300 and the display unit 100 is the first angle θ1 and the pointing part 300 moves by a first interval G11 in the vertical direction DRV, the pointer C may move by a second interval G12 in the vertical direction DRV on the display unit 100. Unlike this, when the horizontal angle between the pointing part 300 and the display unit 100 is the second angle θ2 greater than the first angle θ1 and the pointing part 300 moves by the first interval G11 in the vertical direction DRV, the pointer C may move by a third interval G13 greater than the second interval G12 in the vertical direction DRV on the display unit 100.

In this instance, the moving distance of the pointer C in the horizontal direction DRH with respect to the moving distance of the pointing part 300 in the horizontal direction DRH may be the same irrespective of the horizontal angle between the pointing part 300 and the display unit 100.

Figure 27:
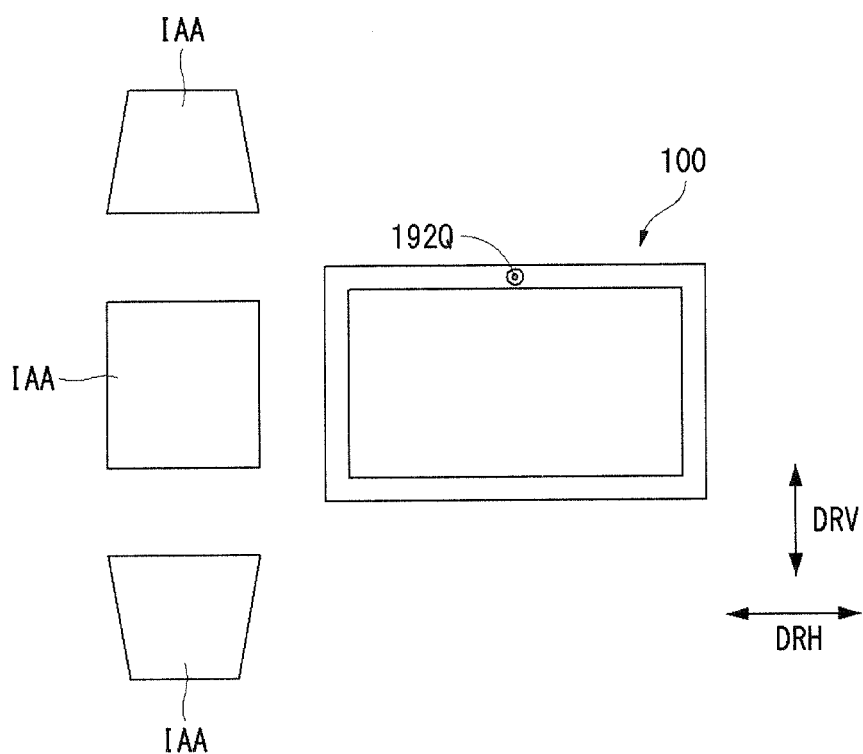

As shown in FIG. 27, when the pointing part 300 is positioned in front of the motion sensing unit 192Q, the interaction area IAA may be configured as an approximately rectangular shape. When the pointing part 300 is positioned on the upper side or the lower side of the motion sensing unit 192Q, the interaction area IAA may be configured as a trapezoid shape, of which the base faces the motion sensing unit 192Q.

This is described below with reference to FIGS. 28 to 31.

Figure 28:
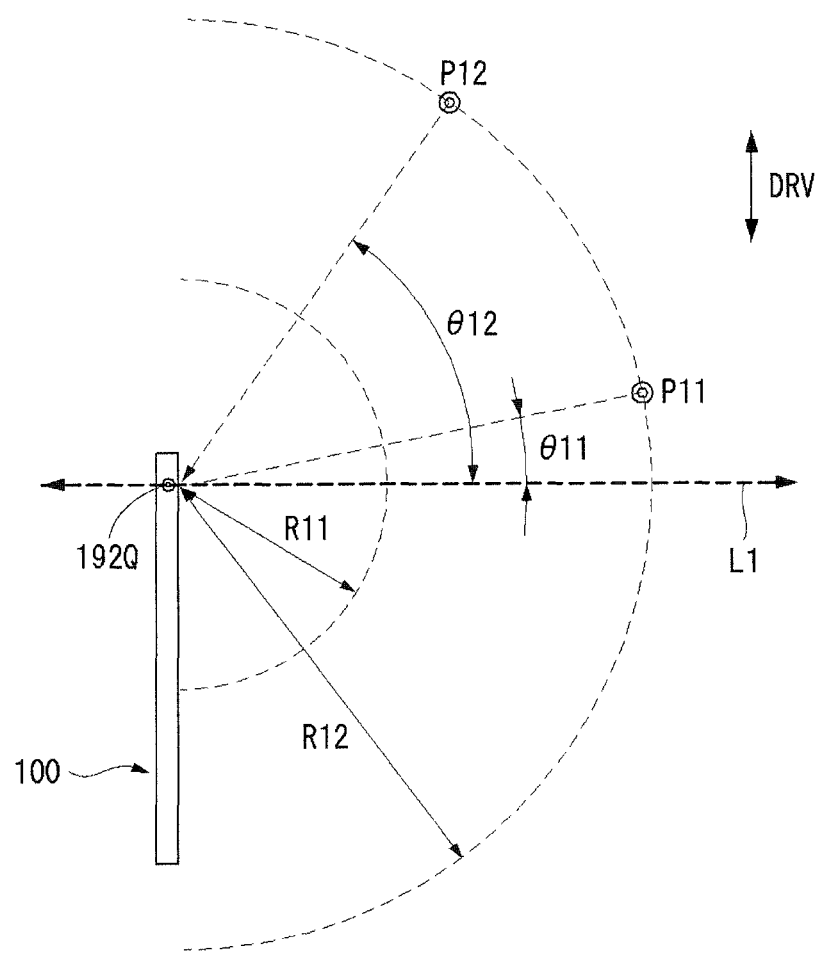

As shown in FIG. 28, an eleventh position P11 and a twelfth position P12 are separated from the motion sensing unit 192Q by a twelfth distance R12 greater than a reference distance R11, an angle between the eleventh position P11 and the motion sensing unit 192Q is an eleventh angle θ11, and an angle between the twelfth position P12 and the motion sensing unit 192Q is a twelfth angle θ12 greater than the eleventh angle θ11. Further, the eleventh position P11 and the twelfth position P12 may be positioned on the upper side of the motion sensing unit 192Q.

Figure 29:
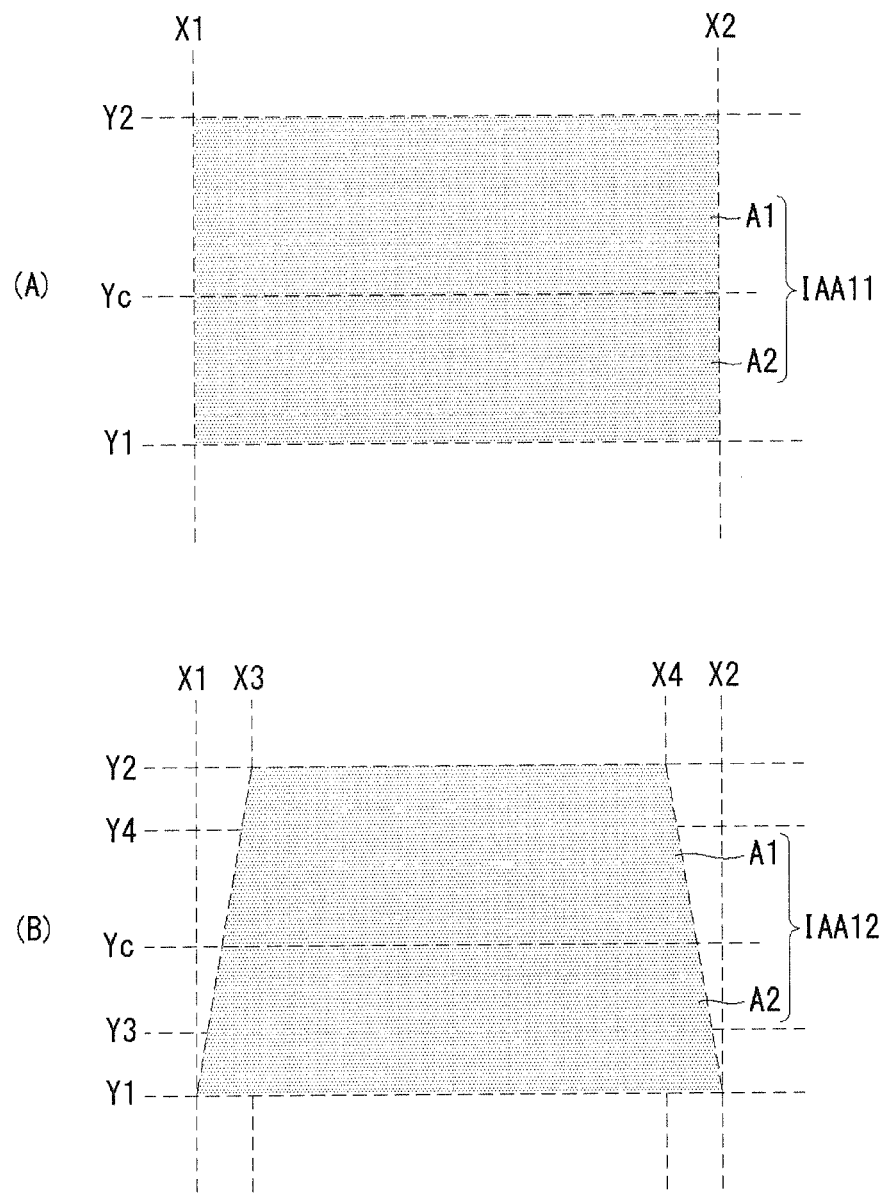

As shown in (A) of FIG. 29, when the pointing part 300 is positioned at the eleventh position P11, an eleventh interaction area IAA11 having a horizontal coordinate of X1-X2 and a vertical coordinate of Y1-Y2 may be set.

The eleventh interaction area IAA11 may be divided into a first area A1 and a second area A2 based on a central axis Yc in the vertical direction DRV. The first area A1 and the second area A2 of the eleventh interaction area IAA11 may almost have the same size.

Because a horizontal coordinate Yc in the eleventh interaction area IAA11 is the central axis, Yc-Y1 may be substantially the same as Y2-Yc.

As shown in (B) of FIG. 29, when the pointing part 300 is positioned at the twelfth position P12, a twelfth interaction area IAA12 smaller than the eleventh interaction area IAA11 may be set.

The twelfth interaction area IAA12 may be divided into a first area A1 and a second area A2 based on the central axis Yc in the vertical direction DRV. The first area A1 and the second area A2 of the twelfth interaction area IAA12 may have different sizes. Preferably, the size of the second area A2 close to the motion sensing unit 192Q may be greater than the size of the first area A1.

The size of the first area A1 of the eleventh interaction area IAA11 may be greater than the size of the first area A1 of the twelfth interaction area IAA12, or the size of the second area A2 of the eleventh interaction area IAA11 may be greater than the size of the second area A2 of the twelfth interaction area IAA12. Hence, the size of the eleventh interaction area IAA11 may be greater than the size of the twelfth interaction area IAA12.

Further, a difference between the sizes of the first area A1 and the second area A2 of the twelfth interaction area IAA12 may be greater than a difference between the sizes of the first area A1 and the second area A2 of the eleventh interaction area IAA11.

As the twelfth interaction area IAA12 is far away from the motion sensing unit 192Q, the twelfth interaction area IAA12 may include a portion having a decreasing width in the horizontal direction.

The twelfth interaction area IAA12 may have a trapezoid shape, of which the base Y1 faces the motion sensing unit 192Q. A horizontal coordinate of an upper side of twelfth interaction area IAA12 may be X3-X4, and a horizontal coordinate of the base of the twelfth interaction area IAA12 may be X1-X2.

Hence, the distance of the pointer C corresponding to the moving distance of the pointing part 300 when the pointing part 300 moves from the first area A1 of the twelfth interaction area IAA12 may be greater than the distance of the pointer C corresponding to the moving distance of the pointing part 300 when the pointing part 300 moves from the second area A2 of the twelfth interaction area IAA12.

The fact that the pointing part 300 is positioned in the first area A1 of the twelfth interaction area IAA12 may mean that a vertical angle between the pointing part 300 and the motion sensing unit 192Q is relatively large. Further, the fact that the pointing part 300 is positioned in the second area A2 of the twelfth interaction area IAA12 may mean that a vertical angle between the pointing part 300 and the motion sensing unit 192Q is relatively small.

Figure 30:
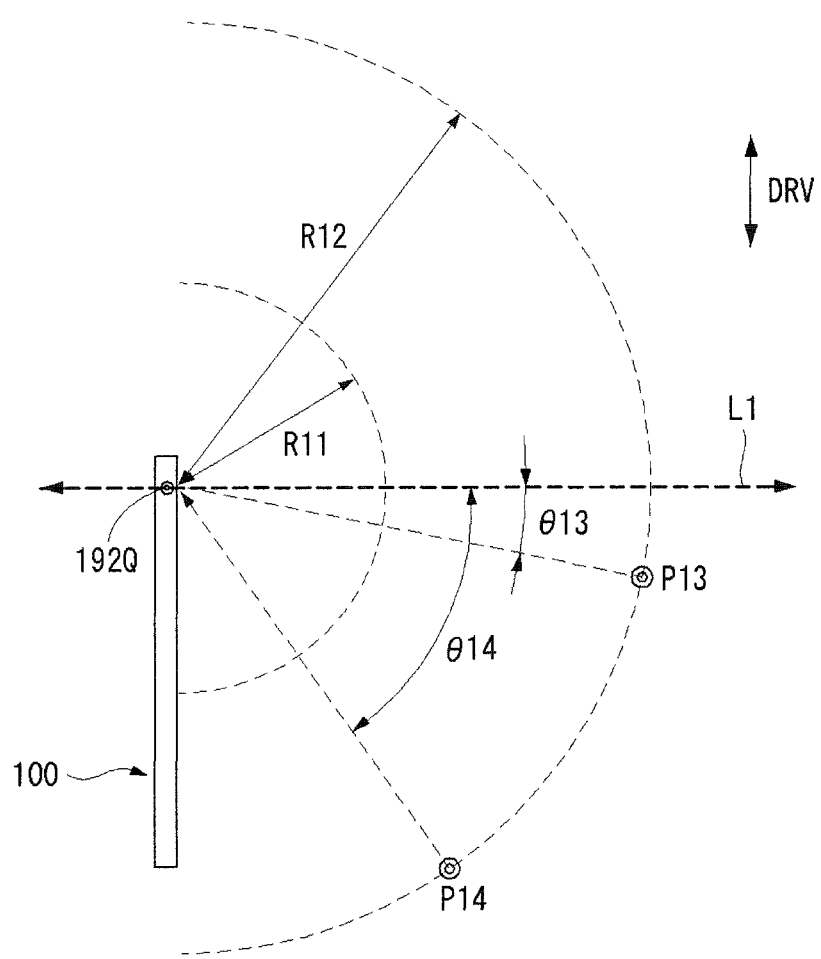

As shown in FIG. 30, a thirteenth position P13 and a fourteenth position P14 are separated from the motion sensing unit 192Q by the twelfth distance R12 greater than the reference distance R11, an angle between the thirteenth position P13 and the motion sensing unit 192Q is a thirteenth angle θ13, and an angle between the fourteenth position P14 and the motion sensing unit 192Q is a fourteenth angle θ14 greater than the thirteenth angle θ13. Further, the thirteenth position P13 and the fourteenth position P14 may be positioned on the lower side of the motion sensing unit 192Q.

Figure 31:
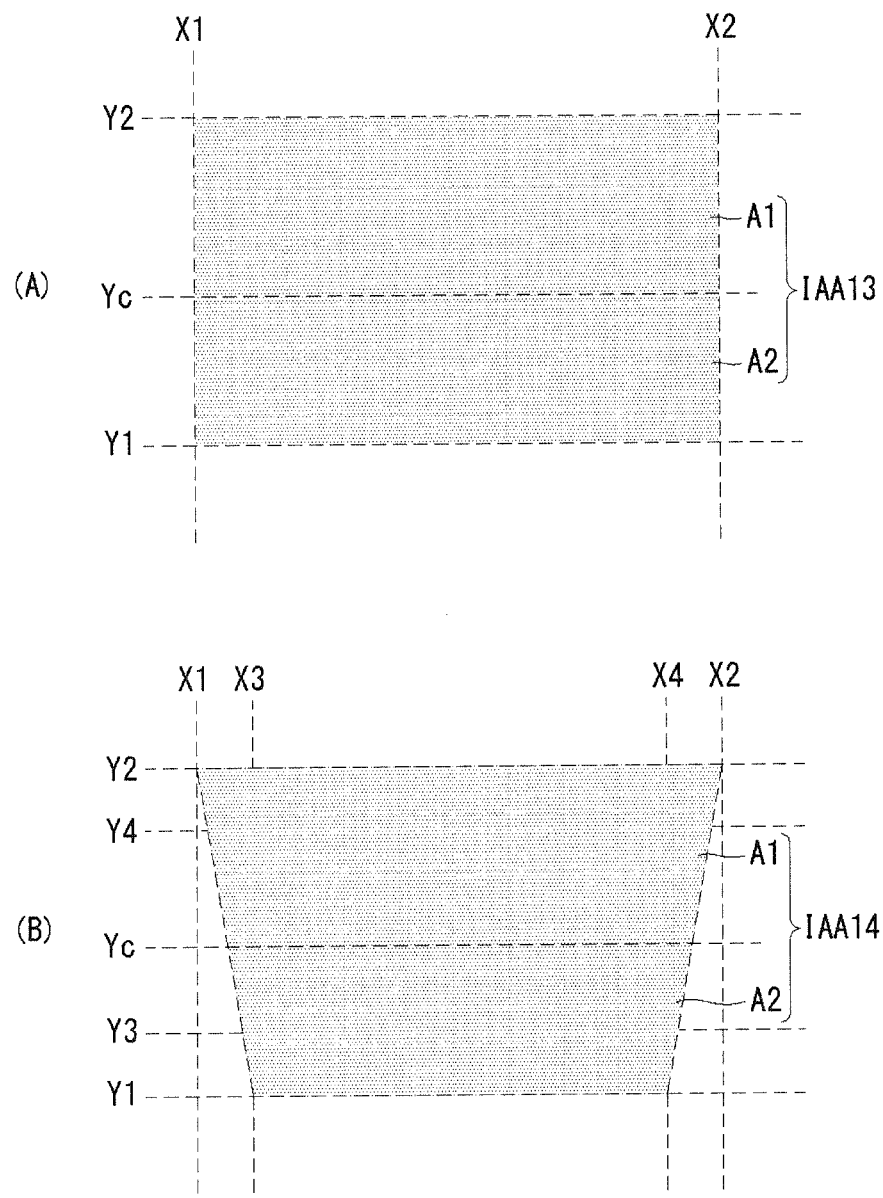

As shown in (A) of FIG. 31, when the pointing part 300 is positioned at the thirteenth position P13, a thirteenth interaction area IAA13 having a horizontal coordinate of X1-X2 and a vertical coordinate of Y1-Y2 may be set.

The thirteenth interaction area IAA13 may be almost the same as the eleventh interaction area IAA11 shown in FIG. 29.

As shown in (B) of FIG. 31, when the pointing part 300 is positioned at the fourteenth position P14, a fourteenth interaction area IAA14 smaller than the thirteenth interaction area IAA13 may be set.

The fourteenth interaction area IAA14 may be divided into a first area A1 and a second area A2 based on the central axis Yc in the vertical direction DRV. The first area A1 and the second area A2 of the fourteenth interaction area IAA14 may have different sizes. Preferably, the size of the first area A1 close to the motion sensing unit 192Q may be greater than the size of the second area A2.

The size of the first area A1 of the thirteenth interaction area IAA13 may be greater than the size of the first area A1 of the fourteenth interaction area IAA14, or the size of the second area A2 of the thirteenth interaction area IAA13 may be greater than the size of the second area A2 of the fourteenth interaction area IAA14. Hence, the size of the thirteenth interaction area IAA13 may be greater than the size of the fourteenth interaction area IAA14.

As the fourteenth interaction area IAA14 is far away from the motion sensing unit 192Q, the fourteenth interaction area IAA14 may include a portion having a decreasing width in the horizontal direction DRH.

The fourteenth interaction area IAA14 may have a trapezoid shape, of which the base Y2 faces the motion sensing unit 192Q. A horizontal coordinate of an upper side of the fourteenth interaction area IAA14 may be X1-X2, and a horizontal coordinate of the base of the fourteenth interaction area IAA14 may be X3-X4.

Hence, the distance of the pointer C corresponding to the moving distance of the pointing part 300 when the pointing part 300 moves from the second area A2 of the fourteenth interaction area IAA14 may be greater than the distance of the pointer C corresponding to the moving distance of the pointing part 300 when the pointing part 300 moves from the first area A1 of the fourteenth interaction area IAA14.

The fact that the pointing part 300 is positioned in the second area A2 of the fourteenth interaction area IAA14 may mean that a vertical angle between the pointing part 300 and the motion sensing unit 192Q is relatively large. Further, the fact that the pointing part 300 is positioned in the first area A1 of the fourteenth interaction area IAA14 may mean that a vertical angle between the pointing part 300 and the motion sensing unit 192Q is relatively small.

As described above, the shape of the interaction area IAA when the pointing part 300 is positioned on the upper side of the motion sensing unit 192Q may be different from the shape of the interaction area IAA when the pointing part 300 is positioned on the lower side of the motion sensing unit 192Q.

In the above description, the twelfth interaction area IAA12 and the fourteenth interaction area IAA14 may be symmetrical to each other with respect to the motion sensing unit 192Q.

When the pointing part 300 is positioned on the upper side or the lower side of the motion sensing unit 192Q, the moving distance of the pointer C with respect to the moving distance of the pointing part 300 in the horizontal direction may be adjusted.

More specifically, when the distance between the motion sensing unit 192Q and the pointing part 300 is a first distance equal to or greater than a reference distance, a vertical angle between the pointing part 300 and the display unit 100 is a first angle, and the pointing part 300 moves by a first interval in the horizontal direction, the pointer C may move by a second interval on the display unit 100 in the horizontal direction.

Unlike this, when the distance between the motion sensing unit 192Q and the pointing part 300 is the first distance, the vertical angle between the pointing part 300 and the display unit 100 is a second angle greater than the first angle, and the pointing part 300 moves by the first interval in the vertical direction, the pointer C may move by a third interval greater than the second interval on the display unit 100 in the horizontal direction.

In this instance, the moving distance of the pointer C in the vertical direction DRV with respect to the moving distance of the pointing part 300 in the vertical direction DRV may be the same irrespective of the vertical angle between the pointing part 300 and the display unit 100.

This was sufficiently described above with reference to FIGS. 10 and 11.

When an angle between the pointing part 300 and the motion sensing unit 192Q is within the range of a predetermined angle, the moving distance of the pointer C with respect to the moving distance of the pointing part 300 may be uniformly maintained.

Figure 32:
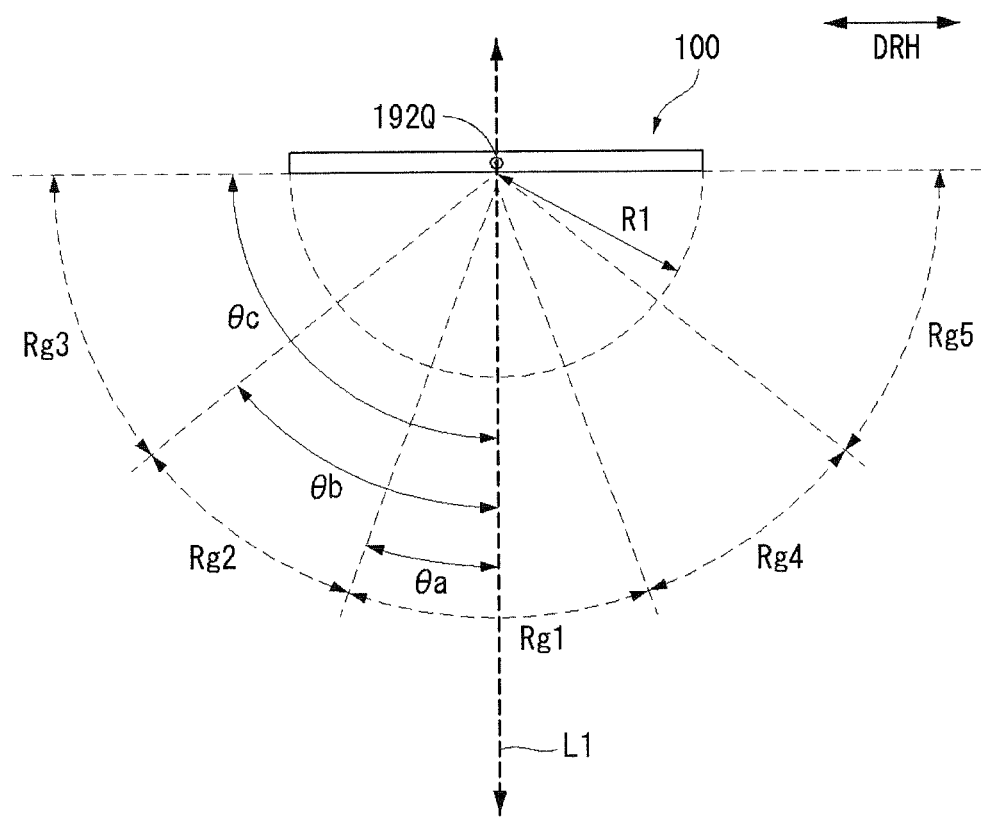
Figure 33:
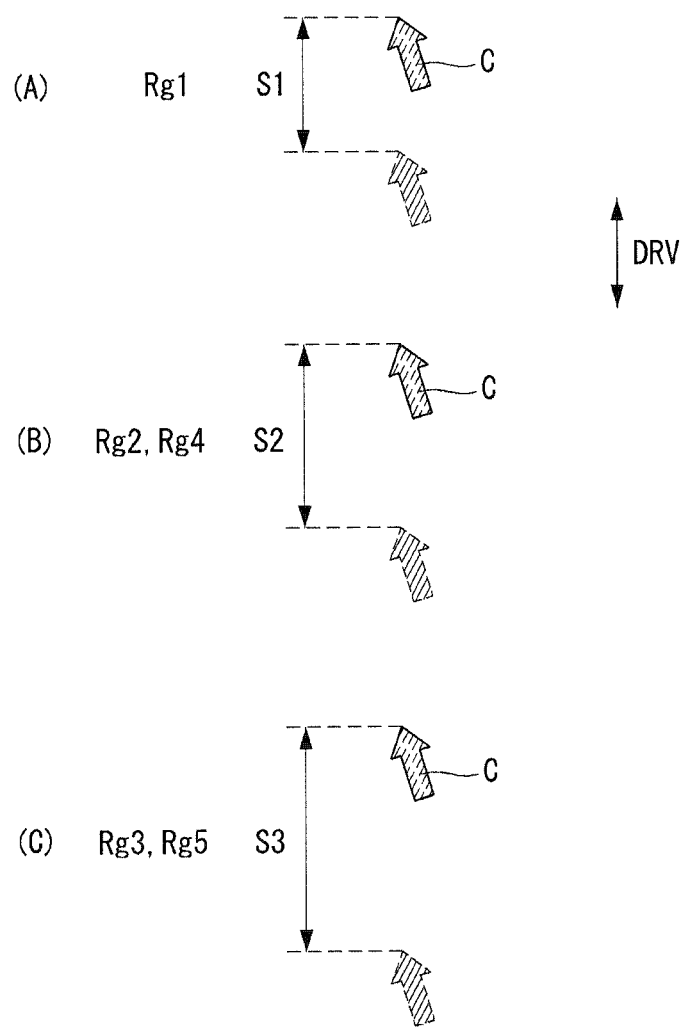

For example, when a horizontal angle between the pointing part 300 and the motion sensing unit 192Q is included in a previously set first range Rg1 as shown in FIG. 32, the pointer C may move by a first distance S1 in the vertical direction DRV with respect to a first motion of the pointing part 300 as shown in (A) of FIG. 33. The first range Rg1 may correspond to the case where the horizontal angle between the pointing part 300 and the motion sensing unit 192Q is θa based on a straight line L1 vertical to the motion sensing unit 192Q.

Further, when the horizontal angle between the pointing part 300 and the motion sensing unit 192Q is included in a previously set second range Rg2 or a previously set fourth range Rg4, the pointer C may move by a second distance S2 greater than the first distance S1 in the vertical direction with respect to the first motion of the pointing part 300 as shown in (B) of FIG. 33. The second range Rg2 may correspond to the case where the horizontal angle between the pointing part 300 and the motion sensing unit 192Q ranges from θa to θb based on the straight line L1 vertical to the motion sensing unit 192Q. The fourth range Rg4 may correspond to the case where the horizontal angle between the pointing part 300 and the motion sensing unit 192Q ranges from −θa to −θb based on the straight line L1 vertical to the motion sensing unit 192Q.

Further, when the horizontal angle between the pointing part 300 and the motion sensing unit 192Q is included in a previously set third range Rg3 or a previously set fifth range Rg5, the pointer C may move by a third distance S3 greater than the second distance S2 in the vertical direction with respect to the first motion of the pointing part 300 as shown in (C) of FIG. 33. The third range Rg3 may correspond to the case where the horizontal angle between the pointing part 300 and the motion sensing unit 192Q ranges from θb to θc based on the straight line L1 vertical to the motion sensing unit 192Q. The fifth range Rg5 may correspond to the case where the horizontal angle between the pointing part 300 and the motion sensing unit 192Q ranges from −θb to −θc based on the straight line L1 vertical to the motion sensing unit 192Q.

Figure 34:
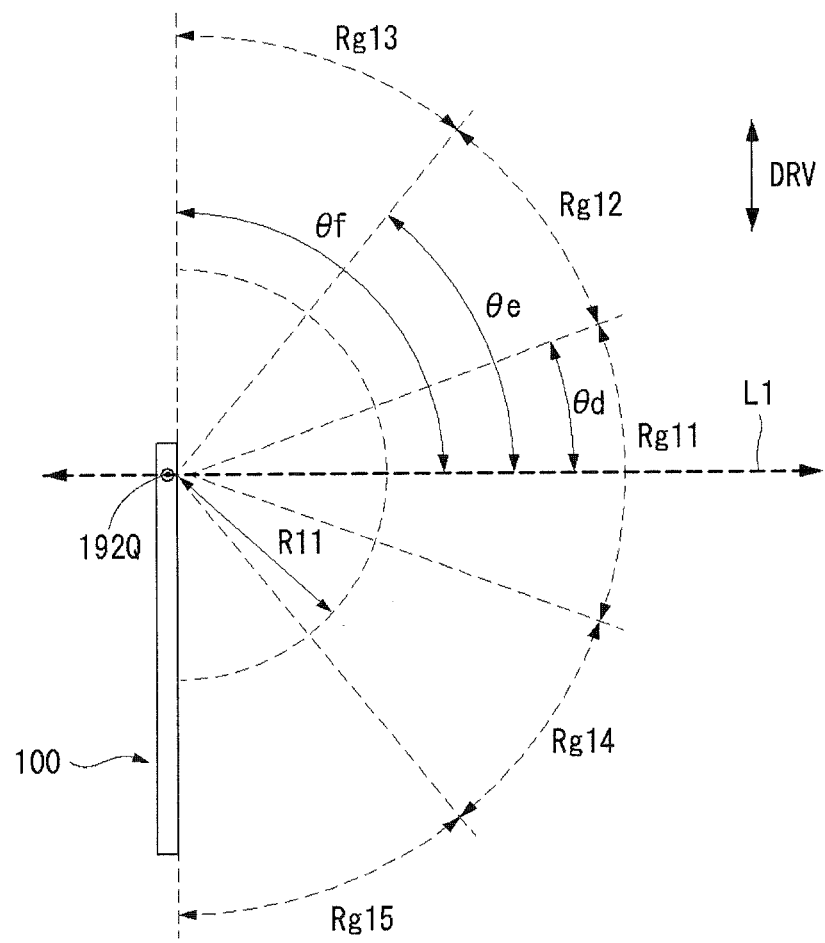
Figure 35:
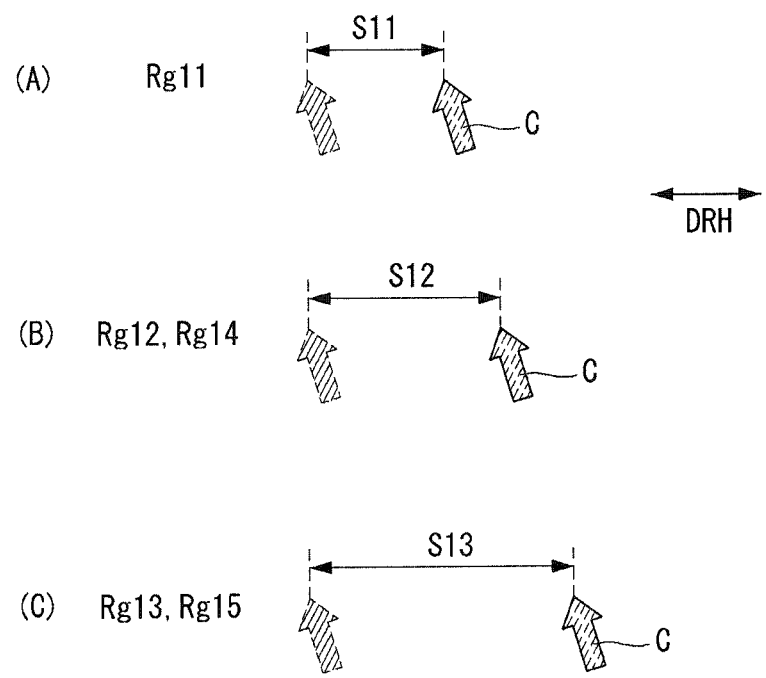

When a vertical angle between the pointing part 300 and the motion sensing unit 192Q is included in a previously set eleventh range Rg11 as shown in FIG. 34, the pointer C may move by an eleventh distance S11 in the horizontal direction DRH with respect to a second motion of the pointing part 300 as shown in (A) of FIG. 35. The eleventh range Rg11 may correspond to the case where the vertical angle between the pointing part 300 and the motion sensing unit 192Q is θd based on a straight line L1 vertical to the motion sensing unit 192Q.

Further, when the vertical angle between the pointing part 300 and the motion sensing unit 192Q is included in a previously set twelfth range Rg12 or a previously set fourteenth range Rg14, the pointer C may move by a twelfth distance S12 greater than the eleventh distance S11 in the horizontal direction with respect to the second motion of the pointing part 300 as shown in (B) of FIG. 35. The twelfth range Rg12 may correspond to the case where the vertical angle between the pointing part 300 and the motion sensing unit 192Q ranges from θd to θe based on the straight line L1 vertical to the motion sensing unit 192Q. The fourteenth range Rg14 may correspond to the case where the vertical angle between the pointing part 300 and the motion sensing unit 192Q ranges from −θd to −θe based on the straight line L1 vertical to the motion sensing unit 192Q.

Further, when the vertical angle between the pointing part 300 and the motion sensing unit 192Q is included in a previously set thirteenth range Rg13 or a previously set fifteenth range Rg15, the pointer C may move by a thirteenth distance S13 greater than the twelfth distance S12 in the horizontal direction with respect to the second motion of the pointing part 300 as shown in (C) of FIG. 35. The thirteenth range Rg13 may correspond to the case where the vertical angle between the pointing part 300 and the motion sensing unit 192Q ranges from θe to θf based on the straight line L1 vertical to the motion sensing unit 192Q. The fifteenth range Rg15 may correspond to the case where the vertical angle between the pointing part 300 and the motion sensing unit 192Q ranges from −θe to −θf based on the straight line L1 vertical to the motion sensing unit 192Q.

Figure 36:
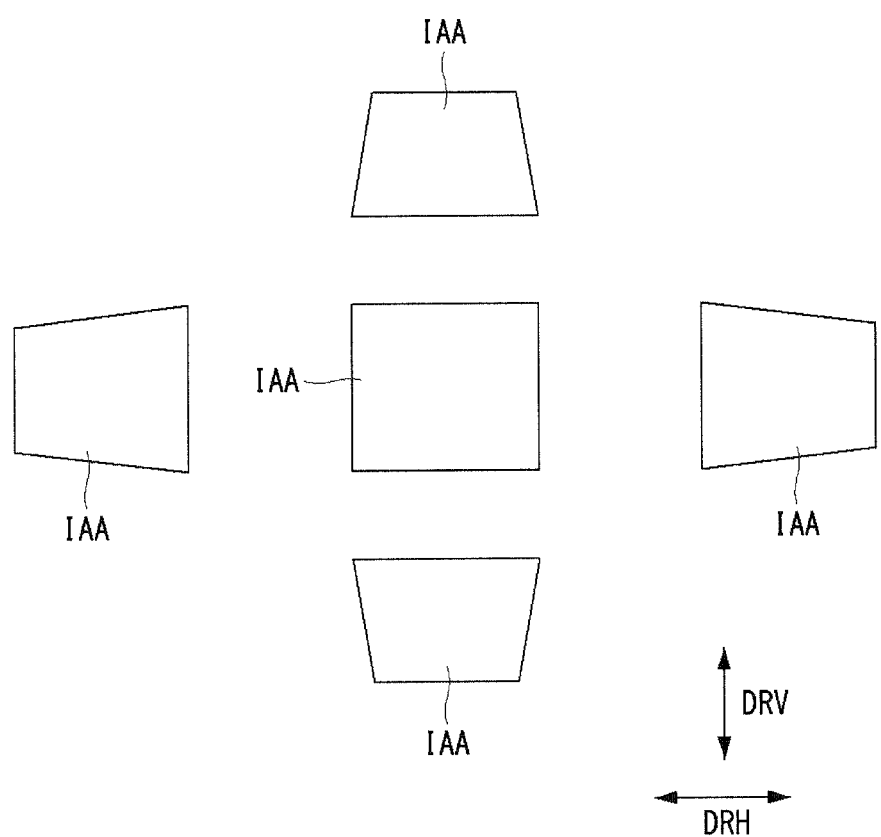
FIGS. 36 to 38 illustrate a pointing method considering both a distance and an angle.
Figure 37:
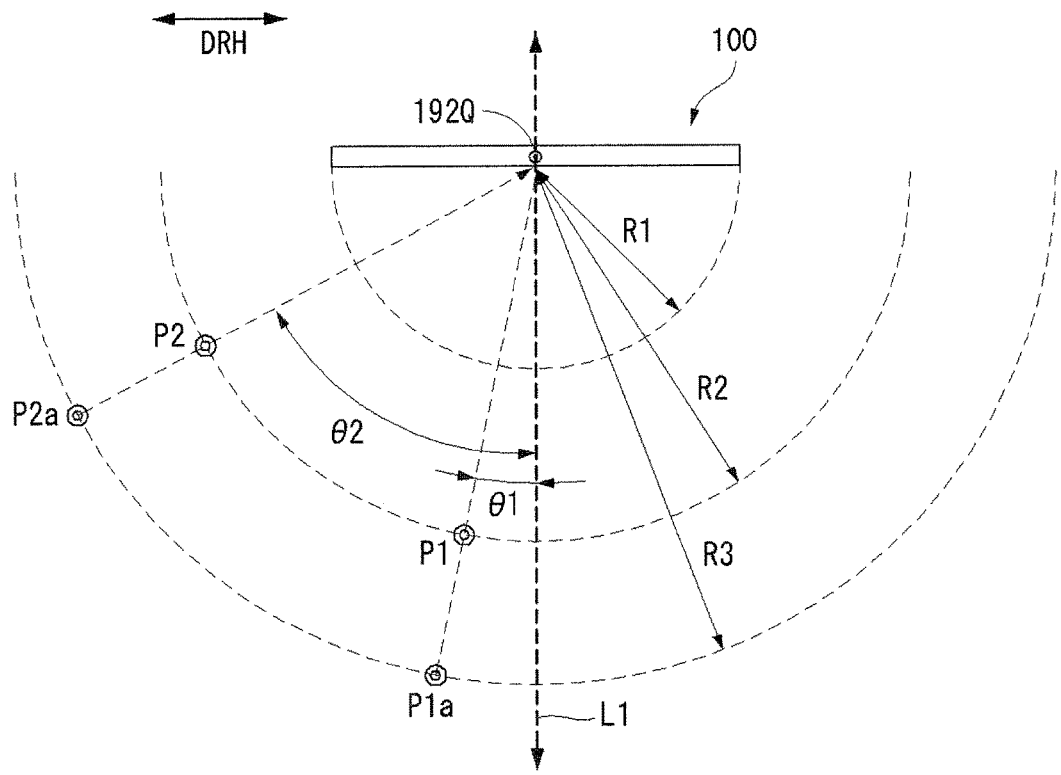
Figure 38:
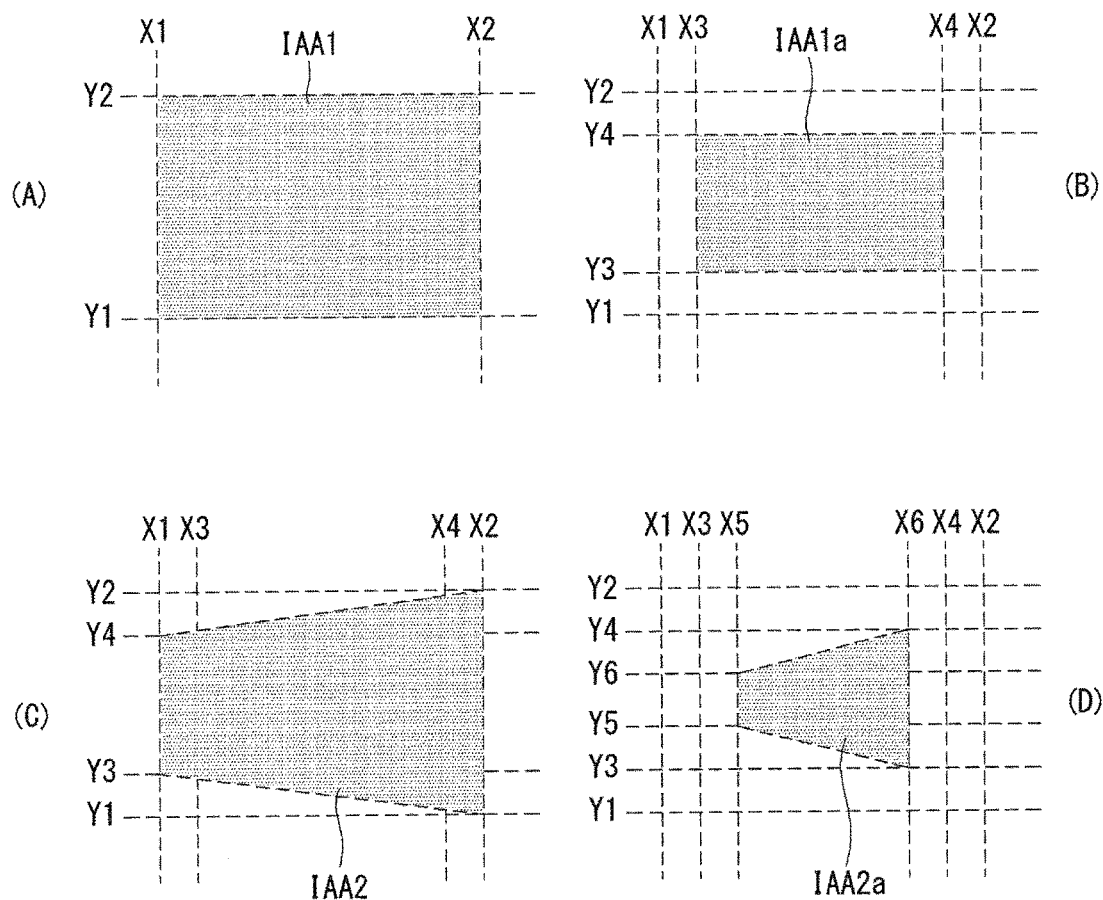

FIGS. 36 to 38 illustrate a pointing method considering both a distance and an angle. In what follows, those descriptions given above will be omitted.

In the embodiment of the invention, in the step of moving the pointer C, the moving distance of the pointer C may vary depending on a distance from the pointing part 300 and an angle between the pointing part 300 and the display unit 100.

For this, as shown in FIG. 36, the shape of the interaction area IAA may vary depending on a position of the pointing part 300. The interaction areas IAA shown in FIG. 36 were sufficiently described above with reference to FIGS. 20 to 27.

As shown in FIG. 37, a first position P1 and a second position P2 are separated from the motion sensing unit 192Q by a first distance R2 greater than a reference distance R1, an angle between the first position P1 and the motion sensing unit 192Q is a first angle θ1, and an angle between the second position P2 and the motion sensing unit 192Q is a second angle θ2 greater than the first angle θ1. Further, a 1a position P1a and a 2a position P2a are separated from the motion sensing unit 192Q by a second distance R3 greater than the first distance R2, an angle between the 1a position P1a and the motion sensing unit 192Q is the first angle θ1, and an angle between the 2a position P2a and the motion sensing unit 192Q is the second angle θ2.

As shown in (A) of FIG. 38, when the pointing part 300 is positioned at the first position P1, a first interaction area IAA1 of a rectangular shape having a horizontal coordinate of X1-X2 and a vertical coordinate of Y1-Y2 may be set.

As shown in (B) of FIG. 38, when the pointing part 300 is positioned at the 1a position P1a, a 1a interaction area IAA1a, which has approximately the same shape as the first interaction area IAA1 and has a size smaller than the first interaction area IAA1, may be set. The 1a interaction area IAA1a may have a rectangular shape having a horizontal coordinate of X3-X4 and a vertical coordinate of Y3-Y4.

As shown in (C) of FIG. 38, when the pointing part 300 is positioned at the second position P2, a second interaction area IAA2 of a trapezoid shape, of which the base X2 faces the motion sensing unit 192Q, may be set. A size of the second interaction area IAA2 may be smaller than a size of the first interaction area IAA1. This was described in detail above with reference to FIG. 22.

As shown in (D) of FIG. 38, when the pointing part 300 is positioned at the 2a position P2a, a 2a interaction area IAA2a, which has approximately the same shape as the second interaction area IAA2 and has a size smaller than the second interaction area IAA2, may be set.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. Therefore, it should be defined by the appended claims or equivalents of the appended claims. In addition to variations and modifications in the component parts and/or arrangements, alternative uses will also be apparent to those skilled in the art.

The invention claimed is:

1. A method for driving a display device comprising:
   detecting a pointing part inputting a gesture command by a motion sensing unit;
   setting an interaction area including the pointing part;
   detecting a motion of the pointing part in the interaction area; and
   moving a pointer displayed on a screen of a display unit depending on the motion of the pointing part,
   wherein a moving distance of the pointer is set as a ratio of a moving distance of the pointing part to a size of the interaction area,
   wherein when a distance between the motion sensing unit and the pointing part is a first distance equal to or greater than a previously set reference distance and an angle between the pointing part and the display unit is a first angle, a first interaction area is set,
   wherein when the distance between the motion sensing unit and the pointing part is the first distance and the angle between the pointing part and the display unit is a second angle greater than the first angle, a second interaction area is set, and
   wherein a size of the first interaction area is greater than a size of the second interaction area.

2. A display device comprising:
   a motion sensing unit;
   a display unit configured to display a pointer; and
   a controller configured to:
   sense, via the motion sensing unit, an angle between a pointing part and the display unit, and
   differently control a motion of the pointer corresponding to a moving distance of a pointing part depending on an angle between the pointing part inputting a gesture command and the display unit when a distance between the motion sensing unit and the pointing part is equal to or greater than a previously set reference distance.

3. The display device of claim 2,
wherein the angle between the pointing part and the display unit is an angle between a straight line connecting the pointing part and the motion sensing unit and a straight line vertical to the motion sensing unit, and
wherein the straight line vertical to the motion sensing unit is parallel to a straight line vertical to a screen of the display unit.

4. The display device of claim 3, wherein when the distance between the motion sensing unit and the pointing part is a first distance equal to or greater than the reference distance, the angle between the pointing part and the display unit is a first angle, and the pointing part moves by a first interval, the pointer is configured to move, by a second interval on the display unit, and
wherein when the distance between the motion sensing unit and the pointing part is the first distance, the angle between the pointing part and the display unit is a second angle greater than the first angle, and the pointing part moves by the first interval, the pointer is configured to move by a third interval greater than the second interval on the display unit.

5. The display device of claim 3, wherein when the distance between the motion sensing unit and the pointing part is a first distance equal to or greater than the reference distance, a horizontal angle between the pointing part and the display unit is a first angle, and the pointing part moves by a first interval in a vertical direction, the pointer is configured to move by a second interval on the display unit in the vertical direction, and
when the distance between the motion sensing unit and the pointing part is the first distance, the horizontal angle between the pointing part and the display unit is a second angle greater than the first angle, and the pointing part moves by the first interval in the vertical direction, the pointer is configured to move by a third interval greater than the second interval on the display unit in the vertical direction.

6. The display device of claim 3, wherein when the distance between the motion sensing unit and the pointing part is a first distance equal to or greater than the reference distance, a vertical angle between the pointing part and the display unit is a first angle, and the pointing part moves by a first interval in a horizontal direction, the pointer is configured to move by a second interval on the display unit in the horizontal direction, and
wherein when the distance between the motion sensing unit and the pointing part is the first distance, the vertical angle between the pointing part and the display unit is a second angle greater than the first angle, and the pointing part moves by the first interval in the vertical direction, the pointer is configured to move by a third interval greater than the second interval on the display unit in the horizontal direction.

7. A method for driving a display device comprising:
detecting a pointing part inputting a gesture command;
sensing, via a motion sensing unit, an angle between a pointing part and the display unit; and
differently controlling a motion of the pointer corresponding to a moving distance of a pointing part depending on an angle between the pointing part inputting a gesture command and the display unit when a distance between the motion sensing unit and the pointing part is equal to or greater than a previously set reference distance.

8. The method of claim 7, further comprising:
setting an interaction area including the pointing part; and
detecting the motion of the pointing part in the interaction area,
wherein the moving distance of the pointer is set as a ratio of a moving distance of the pointing part to a size of the interaction area.

9. The method of claim 8,
wherein the angle between the pointing part and the display unit is an angle between a straight line connecting the pointing part and the motion sensing unit and a straight line vertical to the motion sensing unit, and
wherein the straight line vertical to the motion sensing unit is parallel to a straight line vertical to a screen of the display unit.

10. The method of claim 9, wherein a size of the interaction area when a distance between the motion sensing unit and the pointing part is a first distance is greater than a size of the interaction area when the distance between the motion sensing unit and the pointing part is a second distance greater than the first distance.

11. The method of claim 9, wherein when a distance between the motion sensing unit and the pointing part is a first distance equal to or greater than a previously set reference distance and the angle between the pointing part and the display unit is a first angle, a first interaction area is set,
wherein when the distance between the motion sensing unit and the pointing part is the first distance and the angle between the pointing part and the display unit is a second angle greater than the first angle, a second interaction area is set, and
wherein a size of the first interaction area is greater than a size of the second interaction area.

12. The method of claim 11, wherein the first interaction area and the second interaction area each include a first area and a second area opposite the first area, and
wherein a difference between sizes of the first area and the second area of the second interaction area is greater than a difference between sizes of the first area and the second area of the first interaction area.

13. The method of claim 12, wherein the size of the first area of the first interaction area is greater than the size of the first area of the second interaction area, or the size of the second area of the first interaction area is greater than the size of the second area of the second interaction area.

* * * * *